(12) United States Patent
Koike

(10) Patent No.: US 6,650,329 B1
(45) Date of Patent: Nov. 18, 2003

(54) GAME SYSTEM AND PROGRAM

(75) Inventor: Toshiyuki Koike, Ota-ku (JP)

(73) Assignee: Namco, Ltd., Tokyo (JP)

( * ) Notice: Subject to any disclaimer, the term of this patent is extended or adjusted under 35 U.S.C. 154(b) by 0 days.

(21) Appl. No.: 09/744,440

(22) PCT Filed: May 19, 2000

(86) PCT No.: PCT/JP00/03217

§ 371 (c)(1),
(2), (4) Date: Feb. 15, 2001

(30) Foreign Application Priority Data

May 26, 1999 (JP) .......................................... 11-146584

(51) Int. Cl.[7] ................................................. G06T 15/70
(52) U.S. Cl. ........................ 345/473; 345/419; 345/427; 463/31; 463/32
(58) Field of Search ................................ 345/419, 473, 345/427, 629; 382/154; 463/31, 32

(56) References Cited

U.S. PATENT DOCUMENTS

| | | | | |
|---|---|---|---|---|
| 5,745,126 A | * | 4/1998 | Jain et al. | .................... 382/154 |
| 5,779,548 A | * | 7/1998 | Asai et al. | ..................... 463/31 |
| 6,267,674 B1 | * | 7/2001 | Kondo et al. | ................. 463/32 |

FOREIGN PATENT DOCUMENTS

| | | |
|---|---|---|
| EP | 844 580 A2 | 11/1997 |
| JP | 9-239151 | 9/1997 |
| JP | 10-201951 | 8/1998 |
| JP | 10-201958 | 8/1998 |
| JP | A 2000-189664 | 7/2000 |
| JP | A 2000-207582 | 7/2000 |
| WO | WO 96/00601 | 1/1996 |

* cited by examiner

Primary Examiner—Mark Zimmerman
Assistant Examiner—Kimbinh T. Nguyen
(74) Attorney, Agent, or Firm—Oliff & Berridge, PLC

(57) ABSTRACT

The objective of this invention is to provide a game system and program that enable a greater variety of replay images, removing any monotony from such replay images. If an enemy object (16) is "locked-on" during a game, virtual camera change data is stored as replay data and virtual cameras for replay CA to CE are changed to a virtual camera CP pointing towards the enemy object (16) from the player object (10) or a virtual camera CQ disposed in close proximity to the enemy object (16). When an action occurs between first and second objects (or when such an action becomes possible), or when it is determined that first and second objects are in a given positional relationship, based on position data, the virtual camera for replay changes. The system determines a packet necessary for the replay processing of the current frame (a packet comprising virtual camera change data), and stores it as replay data. After a virtual camera has changed, further changes in the virtual camera are prohibited until a given period of time has elapsed.

50 Claims, 16 Drawing Sheets

LOCK-ON --> STORAGE OF VIRTUAL CAMERA CHANGE DATA

LOCK-ON --> STORAGE OF VIRTUAL CAMERA CHANGE DATA

RANDOM SWITCHING OF CAMERAS CA TO CE

RANDOM SWITCHING OF CAMERA CP AND CQ

VIRTUAL CAMERA CP

VIRTUAL CAMERA CQ

FIG. 7

| | LOCK-ON FLAG | |
|---|---|---|
| FRAME K-1 | 0 | |
| FRAME K | 1 (LOCK-ON START) | → STORE |
| FRAME K+1 | 1 | |
| FRAME K+2 | 1 | |
| ⋮ | ⋮ | |
| FRAME K+L-1 | 1 | |
| FRAME K+L | 0 (LOCK-ON CANCEL) | → STORE |
| FRAME K+L+1 | 0 | |
| ⋮ | ⋮ | |
| FRAME K+M-1 | 0 | |
| FRAME K+M | 1 (LOCK-ON START) | → STORE |
| FRAME K+M+1 | 1 | |

GAME SYSTEM AND PROGRAM

TECHNICAL FIELD

The present invention relates to a game system and program.

BACKGROUND ART

There are many game systems known in the art that enable players to enjoy a game such as a shooting game, a sports game, or a hand-to-hand fighting game while viewing game images that are displayed on a screen. A game system of this type is usually provided with a function called a replay function, which enables each player to use this replay function to see the state of his or her own game-play after the game has ended, from a viewpoint that differs from that used in the game itself. A prior-art technique for implementing a game system having such a replay function is disclosed in International Publication No. WO96/00601, for example.

However, conventional game systems having replay functions always use a predetermined virtual camera for creating replay images. They are therefore unable to present replay images that show the effects of the player's game-play during a game. The created replay images are therefore monotonous and uniform, so it is not possible to increase the variety of such replay images.

DISCLOSURE OF THE INVENTION

The present invention was devised in the light of the above described technical problem and has as an objective thereof the provision of a game system and program that enable a greater variety of replay images, removing any monotony from such replay images.

In order to solve the above described technical problems, the present invention relates to a game system which creates a game image, comprising: means for writing virtual camera change data as replay data into a replay data storage means for storage when a second object within a plurality of objects has come into a capture state within a game; and means for changing virtual cameras that are used in the creation of replay images, based on the virtual camera change data comprised within the thus-stored replay data. A computer-usable information storage medium in accordance with this aspect of the invention comprises information (a program) for implementing (executing) the above described means. A program embodied on an information storage medium or in a carrier wave in accordance with this aspect of the invention comprises a processing routine for implementing (executing) the above described means.

When the second object is in a capture state in accordance with this aspect of the invention, virtual camera change data is stored as replay data. During replay processing, virtual cameras are changed (switched or selected) based on this virtual camera change data. This makes it possible to see different created replay images, depending on whether or not the second object is in a capture state. As a result, it is possible to dramatically increase the variety of replay images, obviating the monotony of such replay images.

In the game system, information storage medium, and program in accordance with the present invention, the capture state may be a lock-on state in a shooting game. This makes it possible to provide a variety of replay images, so that the player of a shooting game can identify which object the player is aiming at, from the replay images.

The present invention also relates to a game system which creates a game image, comprising: means for writing virtual camera change data as replay data into a replay data storage means for storage when an action has occurred between first and second objects or when that action has become possible; and means for changing virtual cameras that are used in the creation of replay images, based on the virtual camera change data comprised within the thus-stored replay data. A computer-usable information storage medium in accordance with this aspect of the invention comprises information (a program) for implementing (executing) the above described means. A program embodied on an information storage medium or in a carrier wave in accordance with this aspect of the invention comprises a processing routine for implementing (executing) the above described means.

When an action (such as a capture, strike, attack, defense, collision, or hit) has occurred between first and second objects in accordance with this aspect of the present invention, or when such an action has become possible, virtual camera change data is stored as replay data. During replay processing, changes in the virtual cameras are based on this virtual camera change data. This makes it possible to dramatically increase the variety of replay images to ensure that the player can see different created replay images depending on whether or not an action has occurred between the first and second objects in the game, or whether or not such an action has become possible.

The present invention further relates to a game system which creates a game image, comprising: means for writing virtual camera change data as replay data in a replay data storage means for storage, when it has been determined that first and second objects are in a given positional relationship, based on position data of the first and second objects; and means for changing virtual cameras that are used in the creation of replay images, based on the virtual camera change data comprised within the thus-stored replay data. A computer-usable information storage medium in accordance with this aspect of the invention comprises information (a program) for implementing (executing) the above described means. A program embodied on an information storage medium or in a carrier wave in accordance with this aspect of the invention comprises a processing routine for implementing (executing) the above described means.

According to this aspect of the invention, when it is determined that there is a given positional relationship between the first and second objects, based on position data of the first and second objects, virtual camera change data is stored as replay data. During replay processing, changes in the virtual cameras are based on this virtual camera change data. This makes it possible to increase the variety of replay images to ensure that the player can see different created replay images depending on whether or not a given positional relationship has occurred between the first and second objects in the game.

In the game system, information storage medium, or program in accordance with the present invention, a virtual camera used in the creation of replay images may be changed to a virtual camera directed towards the second object from the first object or a player's viewpoint, based on the virtual camera change data. This makes it possible to create replay images that appear to be from a position where the second object can be observed to enter the field of view.

In the game system, information storage medium, or program in accordance with the present invention, a virtual camera used in the creation of replay images may be changed to a virtual camera disposed in close proximity to the second object, based on the virtual camera change data. This makes it possible to increase the impression of replay images, by enabling the creation of a replay image as seen from the side of the second object.

In the game system, information storage medium, and program in accordance with the present invention, a packet necessary for the replay processing of the current frame may be determined from among packets used for replay processing and be written into the replay data storage means as replay data corresponding to the current frame, for storage; and the virtual camera change data may be written into the replay data storage means as one of the packets used for replay processing, for storage. This makes it possible to use the replay data storage means efficiently, with no wastage, by selecting only a packet necessary for the replay processing of the current frame for storage in the replay data storage means. Any change in the specifications of the replay data can be accommodated in a simple fashion, even if it becomes necessary to store a new type of replay data.

In the game system, information storage medium, and program in accordance with the present invention, virtual camera change data may be written into the replay data storage means as replay data, on condition that there is a change in the virtual camera change data from the previous frame. This makes it possible to prevent a state in which unnecessary data is stored in the replay data storage means, when situations occur such as not change in the virtual camera change data for a long period of time. Therefore, the storage capacity used by the replay data storage means can be greatly reduced.

In the game system, information storage medium, and program in accordance with the present invention, after the virtual cameras have been changed on the basis of the virtual camera change data, further change of virtual cameras may be prohibited until a given period of time has elapsed, even if further change of virtual cameras is directed. This makes it possible to prevent an unpleasant state in which the replay images from virtual cameras are switched frequently, since further changes in the virtual camera are prohibited for a given period of time, even if such a change is directed repeatedly.

BRIEF DESCRIPTION OF DRAWINGS

FIG. 7 is illustrative of a method of storing virtual camera change data as replay data, provided that there is a change in virtual camera change data from the previous frame.

BEST MODE FOR CARRYING OUT THE INVENTION

Preferred embodiments of the present invention are described below with reference to the accompanying figures. Note that, although the following description relates to an example of the present invention applied to a shooting game, this invention is not limited thereto and thus it can be applied to various other types of game.

1. Structure

Figure 1:
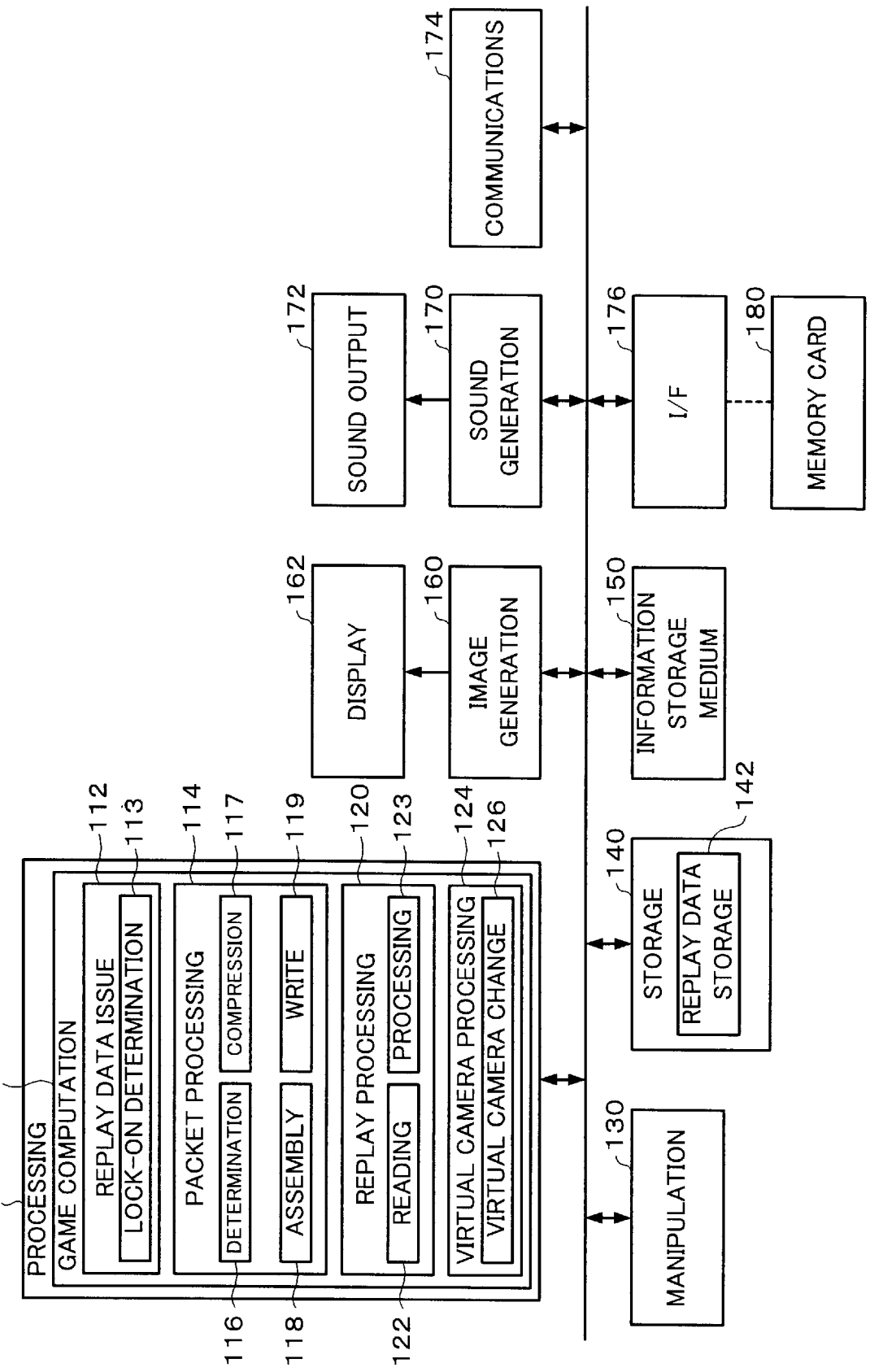
FIG. 1 shows an example of a block diagram of a game system in accordance with an embodiment of the present invention.

A typical block diagram of a device in accordance with an embodiment of this invention is shown in FIG. 1. Note that the embodiment shown in this figure comprises at least a processing section 100 (or the processing section 100 and a storage section 140, or the processing section 100, the storage section 140, and an information storage medium 150), but other blocks thereof (such as a manipulation section 130, an image generation section 160, a display section 162, a sound generation section 170, a sound output section 172, a communications section 174, an interface section 176, and a memory card 180) can be implemented by any other structural components.

In this case, the processing section 100 is designed to perform various types of processing, such as controlling the entire system, issuing instructions to the various blocks within the device, and performing game computations, where the functions thereof can be implemented by hardware such as a CPU (either CISC or RISC), a DSP, or an ASIC (such as a gate array), and by a given program (game program).

The manipulation section 130 is designed to allow the player to input operating data, where the functions thereof can be implemented by hardware such as a joystick, buttons, cross-shaped keys, and a casing.

The storage section 140 acts as a work area for components such as the processing section 100, the image generation section 160, the sound generation section 170, the communications section 174, and the interface section 176, where the functions thereof can be implemented by hardware such as RAM.

The information storage medium (a storage medium that enables the reading of information therefrom by a computer) 150 stores information such as a program and data. The functions thereof can be implemented by hardware such as an optical disk (CD-ROM or DVD), a magneto-optical disk (MO), a magnetic disk, a hard disk, magnetic tape, or semiconductor memory (ROM). The processing section 100 is designed to execute the various types of processing of this invention, based on information such as the program and data stored in this information storage medium 150. The processing section 100 performs various types of processing in accordance with the present invention, based on the information stored in this information storage medium 150. In other words, the information storage medium 150 contains various types of information (program and data) for implementing the means (particularly the blocks comprised within the processing section 100) of this embodiment of the present invention.

Note that all or part of the information stored in the information storage medium 150 can be transferred to the storage section 140 at a suitable time, such as at power-on. The information stored in the information storage medium 150 comprises at least one type of information, such as program coding for executing the processing in accordance with the present invention, image information, sound information, shape information for display objects, table data, list data, player information, information for instructing processing in accordance with the present invention, or information for performing processing in accordance with such instructions.

The image generation section 160 is designed to create various images and output them to the display section 162 in accordance with instructions such as those from the processing section 100, where the functions thereof can be implemented by hardware such as an image generation ASIC, CPU, or DSP, as well as a given program (image creation program) and image information.

The sound generation section 170 is designed to create various sounds and output them to sound output section 172 in accordance with instructions such as those from the processing section 100, where the functions thereof can be implemented by hardware such as a sound generation ASIC, CPU, or DSP, as well as a given program (sound creation program) and sound information (such as waveform data).

The communications section 174 is designed to provide various forms of control for executing communications to and from an external device (such as a host machine or another game system), where the functions thereof can be implemented by hardware such as a communications ASIC or CPU and a given program (communications program).

Note that the information used for implementing the processing of the present invention could also be distributed to the information storage medium 150 possessed by a host device (server), through a network and the communications section 174. The use of such an information storage medium in a host device (server) is comprised within the scope of this invention.

Some or all of the functions of the processing section 100 could equally well be implemented by the functions of the image generation section 160, the sound generation section 170, or the communications section 174. Alternatively, some or all of the functions of the image generation section 160, the sound generation section 170, or the communications section 174 could be implemented by the functions of the processing section 100.

The interface section 176 is designed to provide an interface for exchanging information to and from a memory card (broadly speaking, a portable information storage device comprising a portable game machine or the like) 180, where the functions thereof can be implemented by a slot into which a memory card can be inserted or a controller IC for reading and writing data. Note that if the exchange of information with the memory card 180 is implemented by using wireless means, such as infrared, the functions of the interface section 176 could be implemented by hardware such as a semiconductor laser and an infrared sensor.

The processing section 100 comprises a game computation section 110.

In this case, the game computation section 110 performs various types of game-related processing such as processing for accepting a coin (fee), processing for setting various game modes, processing for moving the game forward, processing for setting selection screens, processing for determining the position and angle (rotational angle about an axis) of an object (character or moving body), processing for determining the viewpoint position and line-of-sight angle, processing for reproducing the motion of an object, processing for disposing an object within an object space, hit check processing, processing for calculating game results (achievements and score), processing for enabling a plurality of players to play in a common game space, or game-over processing, based on factors such as manipulation data from the manipulation section 130 and data and a game program from the memory card 180.

The game computation section 110 comprises a replay data issue section 112, a packet processing section 114, a replay processing section 120, and a virtual camera processing section 124.

In this case, the replay data issue (generate) section 112 performs processing to issue replay data (candidates for replay data to be stored) to be stored in a replay data storage section (replay buffer) 142. More specifically, the functions of this replay data issue section 112 implemented by processing routines for controlling an object (character or moving body) that the player manipulates and processing routines for controlling an object that the computer manipulates. In other words, when an object is moved by the manipulations of the player or the manipulations of the computer, these processing routines issue position data and angle (direction) data for the object after the movement. The thus-issued replay data is input to the packet processing section 114.

In this embodiment of the invention, the replay data issue section 112 comprises a lock-on determination section 113. The lock-on determination section 113 performs processing to determine whether or not there is an enemy object amongst a plurality of enemy objects that has been locked-on (broadly speaking, captured). The result of this determination is output to the packet processing section 114 as replay data.

The packet processing section 114 receives the replay data issued by the replay data issue section 112 then performs processing to write the necessary replay data in packet form into a replay data storage section 142 for storage.

More specifically, the packet processing section 114 comprises a determination section 116, a compression section 117, an assembly section 118, and a write section 119. The determination section 116 determines whether or not to store the replay data from the replay data issue section 112 in the replay data storage section 142. The configuration could be such that values of component data of replay data (such as position data, angle data, animation number, object display/non-display flag, model number, or virtual camera change data) for the current frame are compared with values thereof for the previous frame, and any component data that has changed from the previous frame is stored in the replay data storage section 142, by way of example.

The compression section 117 performs processing to compress the replay data. More specifically, it operates to reduce the number of bits in position data and angle data for objects within the game then stores the compressed position data and angle data in the replay data storage section 142. In this case, the number of bits subtracted from original angle data (or the bit compression ratio) is less than the number of bits subtracted from original position data. This makes it possible to prevent a state such that an object cannot change direction smoothly in a replay image.

The assembly section 118 performs processing to assemble packets for replay data. In other words, it adds headers (packet length and classification data) to the data itself, to create packets.

The write section 119 performs processing to write the packets that have been assembled by the assembly section 118 into the replay data storage section 142. In other words, it writes one or more packets that are necessary for the replay processing of the current frame into the replay data storage section 142 as replay data.

The replay processing section 120 performs the various types of processing required for reading the replay data that is stored in the replay data storage section 142 and creating a replay image. It performs replay processing for an object based on position data and angle data that has been stored with a reduced number of bits.

The replay processing section 120 comprises a reading section 122 and a processing section 123. In this case, the reading section 122 performs processing to read packets of replay data from the replay data storage section 142. The processing section 123 executes the replay processing specified by the classification data comprised within each packet of the thus read-out replay data.

The virtual camera processing section 124 performs the various types of processing for the virtual camera.

During a game, the position and angle (direction) of the virtual camera can be controlled to follow the player object that moves in accordance with the player's manipulations, by way of example. The image seen from this virtual camera is created by the image generation section 160.

During a replay, one virtual camera could be selected at random from a plurality of virtual cameras for replay (virtual camera processing routines). The position and angle of the selected virtual camera are controlled by a given algorithm and the image seen from this virtual camera is created by the image generation section 160.

The virtual camera processing section 124 comprises a virtual camera change section 126. In this case, the virtual camera change section 126 performs processing to change the virtual cameras that are used in the creation of the replay image, based on the virtual camera change data comprised within the replay data that is stored in the replay data storage section 142. More specifically, if there is no virtual camera change data within the replay data (if no enemy object has been locked onto), it performs processing to switch the usual virtual cameras at random. If there is virtual camera change data within the replay data (if an enemy object has been locked onto), on the other hand, it performs processing to switch the virtual cameras used for creating the replay image from the usual virtual cameras to virtual cameras for lock-on, then switches those virtual cameras for lock-on at random.

Note that various virtual cameras such as a virtual camera looking towards an enemy object (or a locked-onto enemy object) from the player object (or the player's viewpoint) or a virtual camera placed in close proximity to the enemy object (such as a virtual camera looking from an enemy object towards the player's object) could be considered as these virtual cameras for lock-on.

With this embodiment of the present invention, after a change in virtual cameras based on the virtual camera change data, the virtual cameras are not changed until a given period of time has elapsed, regardless of whether further change of virtual cameras is directed. This makes it possible to prevent a state in which the virtual cameras are switched frequently, resulting in unpleasant replay images.

Note that the game system in accordance with this embodiment of the invention can be applied both to games in which an individual player plays in single-player mode and to games in which a plurality of players play in multi-player mode.

When a plurality of players are playing, the game images and game sounds provided to those players could be created by using one terminal, or they could be created by a plurality of terminals connected together by means such as a network (data transfer lines or communications lines).

2. Characteristics of this Embodiment of the Invention

A first characteristic of this embodiment concerns the storage of virtual camera change data as replay data when an enemy object has gone into a locked-onto state (broadly speaking, a captured state) and the change of virtual cameras used in the creation of replay images, based on the stored virtual camera change data.

Figure 2:
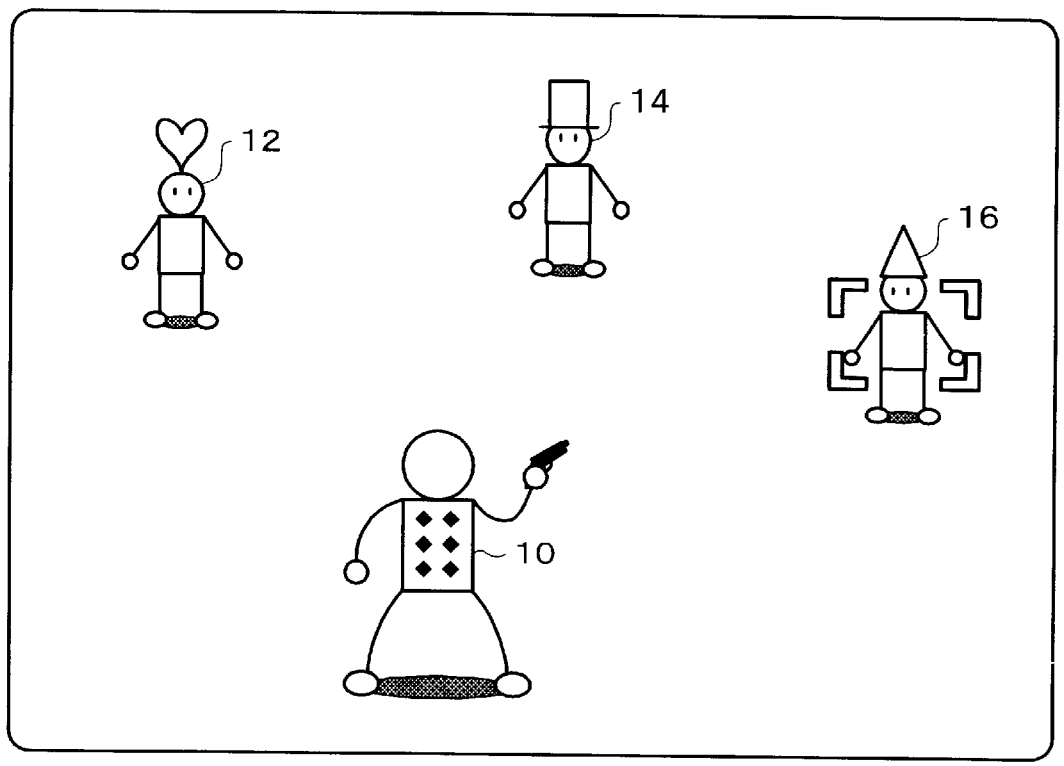
FIG. 2 is illustrative of lock-on (capture) of an enemy object.

Assume, by way of example, that a player object 10 in FIG. 2 has decided to aim at an enemy object 16 from among a plurality of enemy objects 12, 14, and 16, so that the enemy object 16 is locked-onto. When the enemy object 16 goes into a lock-on state with this embodiment of the invention, virtual camera change data is written to the replay data storage section.

Figure 3:
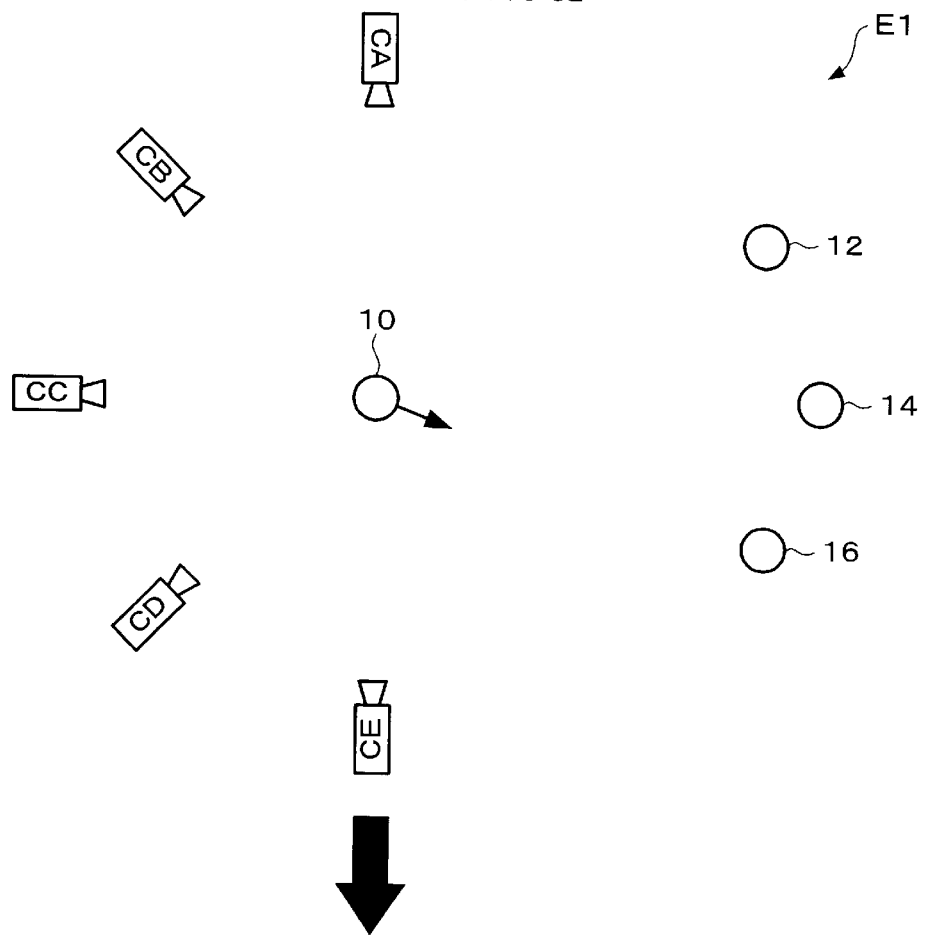
FIG. 3 is illustrative of a method of changing virtual camera for replay, when an enemy object has been locked-onto.
Figure 3:
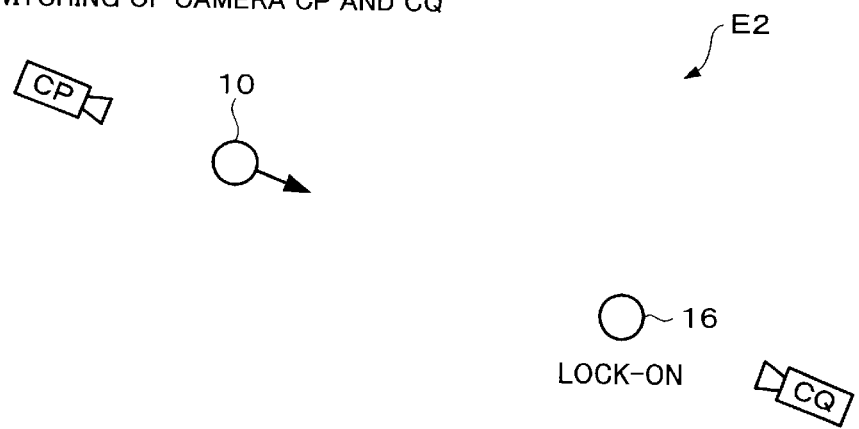

More specifically, when no enemy objects are locked-onto, virtual cameras CA, CB, CC, CD, and CE for usual replay are switched at random, as shown at E1 in FIG. 3. The virtual cameras could be switched at random from CA to CC, from CC to CE, from CE to CB, and from CB to CD, based on a virtual camera switching table within the storage section. This enables the player to see the state of the player's own game play, as seen from various viewpoints different from those used within the game.

When an enemy object has been locked-onto, on the other hand, the virtual cameras used in the creation of replay images are changed from usual cameras CA to CE to lock-on cameras CP and CQ, as shown at E2 in FIG. 3. The virtual cameras CP and CQ are then switched at random, to generate replay images.

In this case, the position and angle (rotational angle about the X, Y, or Z axis) of the virtual camera CP are controlled so as to face towards the locked-on enemy object 16 from the player object 10 (or the player's viewpoint). This virtual camera CP enables the creation of a replay image such as that shown by way of example in FIG. 4A. The player who sees this replay image can determine therefrom which of the enemy objects was being aimed at (or observed) within the game. If the enemy object aimed at by the player is different, the replay image is also seen to be different, making it possible to prevent a state in which the replay images are standardized and monotonous.

The virtual camera CQ is disposed in close proximity to the enemy object 16 and the position and angle of the virtual camera CQ are controlled so as to face towards the player object 10 (or player viewpoint) from the enemy object 16. This virtual camera CQ makes it possible to create a replay image such as that shown in FIG. 4B by way of example.

This replay image is designed to make it possible for the player to view the status of the player object 10 as seen from the direction of the enemy object 16. In otherwords, this configuration makes it possible to view the status of the player object 10 attacking the enemy object 16, thus creating a replay image of an intensity that has not been possible up to now.

With a prior-art game system, the virtual cameras that create replay images are always pre-set (see E1 in FIG. 3). In other words, the pre-set virtual cameras simply switch, regardless of what the player does during the game. This means that the replay images that are created thereby are monotonous and uniform.

In contrast thereto, this embodiment differs from the art in that the created replay images differ according to on which enemy object the player is aiming at.

If the player is aiming at the enemy object 16 and the enemy object 16 is locked-onto, for example, a replay image from a virtual camera pointing towards the enemy object 16 from the player object 10 (see FIG. 4A) and a replay image as seen from the enemy object 16 (see FIG. 4B) are created. Similarly, if the player is aiming at the enemy object 12 and the enemy object 12 is locked-onto, a replay image from a virtual camera pointing towards the enemy object 12 from the player object 10 and a replay image as seen from the enemy object 12 are created. The thus-configured embodiment of the invention ensures that the views of created replay images are changed by the actions of the player in the game (such as the action of aiming at an enemy object), making it possible to dramatically increase the variety of replay images.

Note that the determination of whether or not an enemy object has been locked-onto is based on data such as position data (or direction data) for the player object and position data for the enemy object. That is to say, if it is determined that there is a given positional relationship between a player object (first object) and an enemy object (second object), based on position data for the player object and position data for the enemy object, the enemy object is determined to be locked-onto and virtual camera change data is stored as replay data. Changes in the virtual cameras used for the creation of replay images are based on this virtual camera change data.

In this manner, if it is determined that there is a given positional relationship between objects, based on position data, and if the change in the virtual camera in replay processing is based on that determination result, it is possible to ensure that the control of the virtual camera reflects the position data of objects that are changing in real-time within the game in answer to the player's actions. This makes it possible to dramatically increase the amount of variety in replay images.

A second characteristic of this embodiment of the invention is described below. In this embodiment of the invention, a packet necessary for the replay processing of the current frame is selected from the packets used in replay processing, the selected packet is related to the current frame and stored as replay data, and replay processing for each frame is performed based on the thus-stored replay data. In addition, this embodiment of the invention ensures that virtual camera change data is stored as one of the thus-stored packets for replay processing in the replay data storage section.

Figure 5:
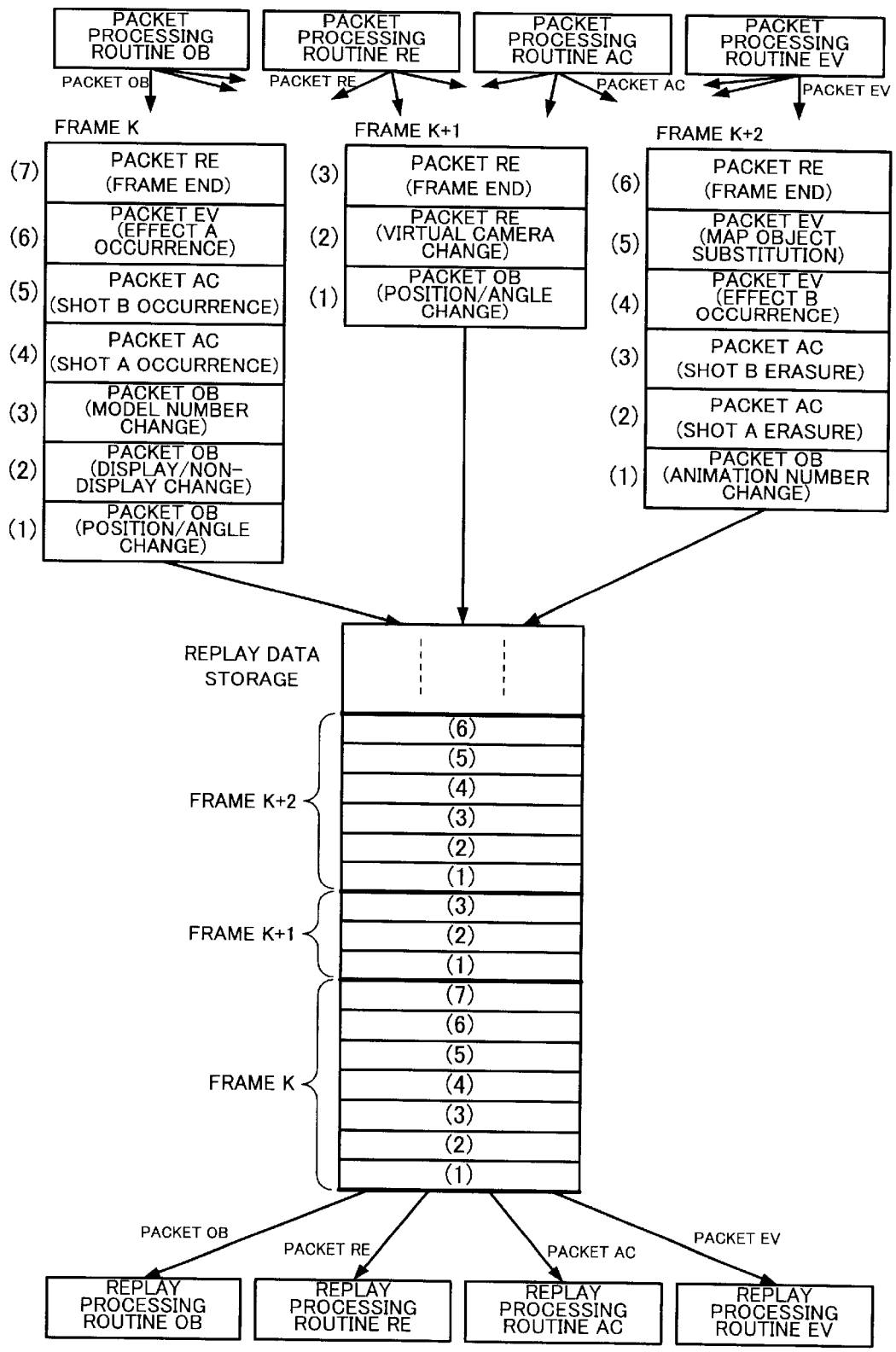
FIG. 5 is illustrative of a method of storing a packet necessary for the replay processing of the current frame as replay data, and also storing virtual camera change data as one such packet.

As shown by way of example in FIG. 5, packet processing routines OB, RE, AC, and EV (respectively relating to object control, replay control, action control, and event control) determine which packets are necessary for replay processing, assemble the packets that have been determined to be necessary, and store them in the replay data storage section (replay buffer), for each frame.

Note that packets OB, RE, AC, and EV assembled by the packet processing routines OB, RE, AC, and EV are packets relating to object control (for objects manipulated by the player or computer), replay control, action control, and event control. In this document, "action" means that an object does something that will affect another object (an attack, such as a shot). An "event" means that an object does something that will not affect another object (issue smoke or sparks), or changes itself. Alternatively, it means a substitution of a map object (substitution of part of a map).

In FIG. 5, by way of example, the following packets are assembled in a frame K and are stored in the replay data storage section as packets for frame K: (1) a packet OB for a change in the position and angle of an object, (2) a packet OB for changes in the display/non-display status of the object, (3) a packet OB for a change in the model number, (4) a packet AC for a shot A (a shot having a rate of movement or rotational angle that is constant or fixed until it is erased), (5) a packet AC for a shot B (a shot having a rate of movement or rotational angle that changes in each frame until it is erased), (6) a packet EV for an effect A (an effect with no movement or-rotation), and (7) a packet RE indicating frame end.

In other words, since there is a change in the position data and angle data of an object (an object manipulated by the player or computer) in frame K, it is determined that a packet for a position or angle change is necessary, and that packet is stored in the replay data storage section. Similarly, there is a change in the display/non-display flag or model number, it is determined that a packet for a change in display/non-display status or model number is necessary, and that packet is stored in the replay data storage section. Furthermore, there is the occurrence of each of a shot A, a shot B, and an effect A, it is determined that a packet for the occurrence of each of a shot A, a shot B, and an effect A is necessary, and that packet is stored in the replay data storage section.

Similarly in a frame K+1, it is determined that the following packets are necessary, and those packets are assembled and are stored in the replay data storage section: (1) a packet OB for a change in the position and angle of an Ad object, (2) a packet RE for a change in virtual cameras (a packet comprising virtual camera change data), and (3) and a packet RE indicating frame end.

Furthermore in a frame K+2, it is determined that the following packets are necessary, and those packets are assembled and are stored in the replay data storage section: (1) a packet OB for a change in animation number of an object, (2) a packet AC for erasing the shot A, (3) a packet AC for erasing the shot B, (4) a packet EV for an effect B (an effect with movement or rotation), (5) a packet EV for substituting a map object, and (6), a packet RE indicating frame end.

The packets stored in this manner in the replay data storage section are read out by replay processing routines OB, RE, AC, and EV. Each of the replay processing routines OB, RE, AC, and EV performs replay processing corresponding to these read-out packets., In this case, the packets OB, RE, AC, and EV relating to object control, replay control, action control, and event control are read out by the corresponding replay processing routines OB, RE, AC, and EV relating to object control, replay control, action control, and event control.

Figure 6:
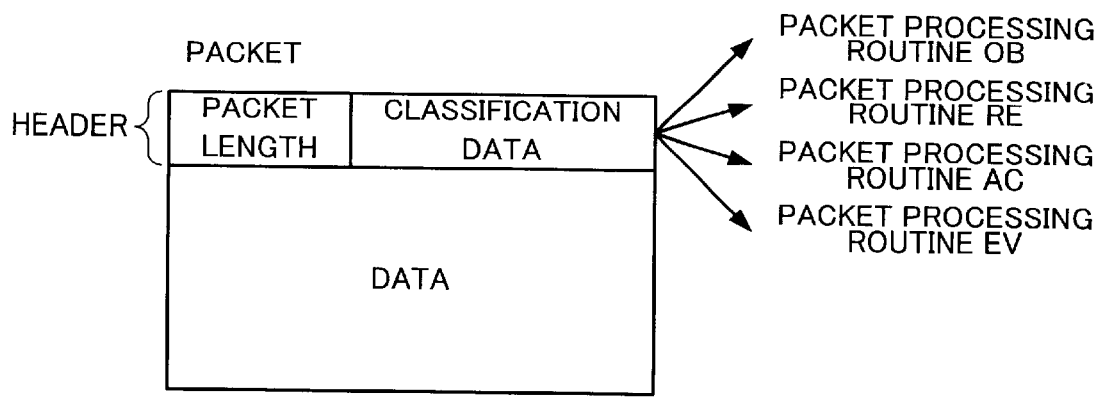
FIG. 6 is illustrative of the classification data that is added to the packet header.

The allocation of the packets OB, RE, AC, and EV to the replay processing routines OB, RE, AC, and EV is based on classification data that is added to the header of each packet, as shown in FIG. 6. The packet processing routines OB, RE, AC, and EV attach this classification data to the header of each packet during packet assembly, before storing the packets in the replay data storage section. Note that the packets of this embodiment of the invention are of variable length, so a packet length is also added to the packet header.

This classification data attached to the packet header is data for classifying the packets OB, RE, AC, and EV. This classification data also functions as detailed classification data for each of the packets OB, RE, AC, and EV. A packet OB is further classified as (1) a packet for changing the position or angle of an object, (2) a packet for changing the display/non-display status, (3) a packet for changing the model number, or (4) a packet for changing the animation number, by way of example. On receiving a packet OB, the replay processing routine OB can determine which of these packets the received packet OB is, based on the classification data comprised within the packet OB.

With the above described method of FIG. 5, the system determines which packets are necessary in each frame, then stores only those necessary packets in the replay data storage section, so that the replay data can be stored efficiently in the replay data storage section with no wastage.

In other words, one method that could be considered for storing replay data in the replay data storage section is a method in which framework of data stored in each frame is always fixed. Use of this method makes it possible to simplify the control for writing replay data to the replay data storage section. With this method, however, the quantity of data to be stored is always the same, both for frames that require a large volume of data to be stored and for frames that require a small volume of data to be stored, which increases the storage capacity required of the replay data storage section.

In contrast thereto, the method of FIG. 5 enables the storage in the replay data storage section of a large number of packets for frames that require a large volume of data to be stored (such as frame K in FIG. 5) and also a small number of packets for frames that require a small volume of data to be stored (such as frame K+1 in FIG. 5). The replay data can therefore be stored efficiently in the replay data storage section, with no wastage.

The method of FIG. 5 also has the advantage of a high level of flexibility in that any change in the specifications of the replay data to be stored, such as a situation that requires the storage of a new type of replay data, can be accommodated in a simple manner.

Figure 4A:
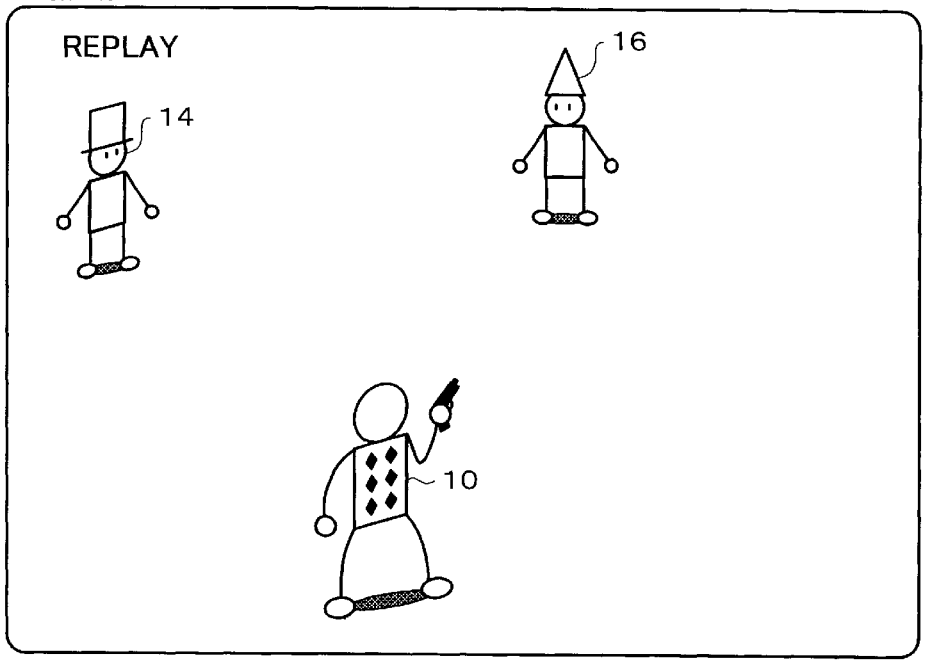
FIGS. 4A and 4B show examples of replay images shown by changed virtual cameras.
Figure 4B:
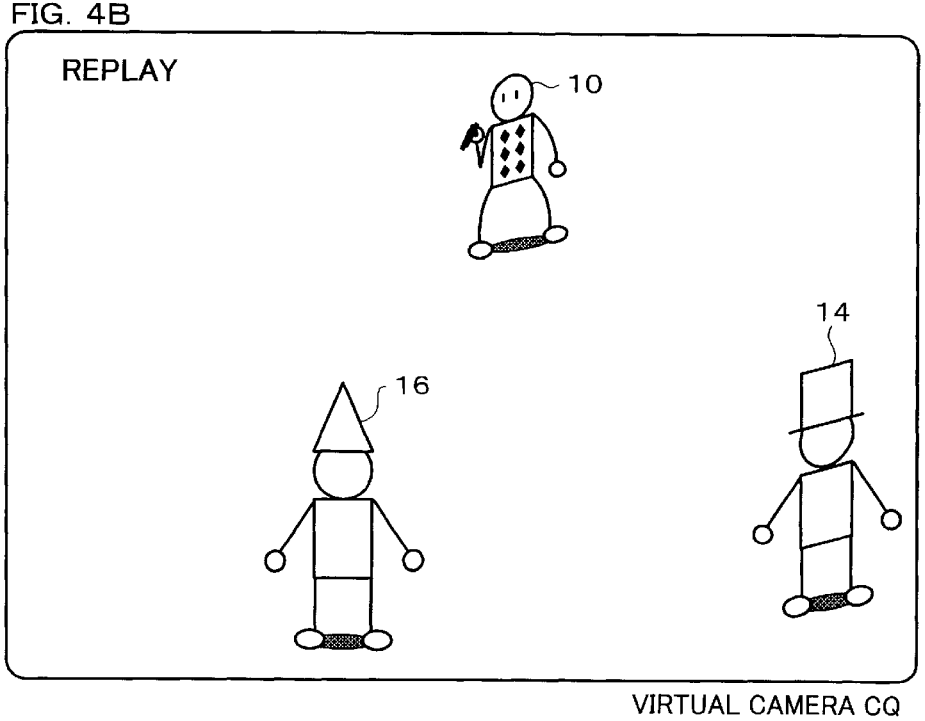

If, for example, it becomes necessary to introduce a new type of replay data as virtual camera change data for creating the replay images of FIGS. 4A and 4B, this can be accommodated in a simple manner. This is because the packets comprising this virtual camera change data can be redefined in such a case.

A third characteristic of this embodiment of the present invention concerns the storage of virtual camera change data as replay data, on condition that there is a change in virtual camera change data from the previous frame.

With this embodiment of the invention, for example, a lock-on flag (broadly speaking, an item of virtual camera change data) is set to 1 when an enemy object is locked-onto and is reset to 0 when that lock-on is canceled.

As shown in FIG. 7, the lock-on flag of this embodiment of the invention is set to 1 at the start of lock-on, then is reset to 0 when the lock-on is canceled, and only virtual camera change data in which a change has occurred (for frame K, frame K+L, and frame K+M) is stored as replay data. If the lock-on flag has not changed so there is no change in the virtual camera change data, on the other hand, no virtual camera change data is stored in the replay data storage section.

If only virtual camera change data in which there is a change from the previous frame is stored in this manner, the amount of redundancy in the replay data stored in the section can be reduced, and the volume of data to be stored in the replay data storage section can be compressed efficiently.

Note that this embodiment of the present invention can also be used in the storage of component data other than virtual camera change data as replay data, such as object position data, object angle data, object model number, animation number in object animation processing (vertex animation processing), or object display/non-display flag, provided there is a change from the previous frame. This makes it possible to greatly reduce the storage capacity used by the replay data storage section.

A fourth characteristic of this embodiment of the present invention ensures that, after a change in virtual cameras based on the virtual camera change data, no change in virtual cameras is permitted until a given period of time has elapsed, even if such a change in virtual cameras is directed (even if virtual camera change data is stored).

Figure 8:
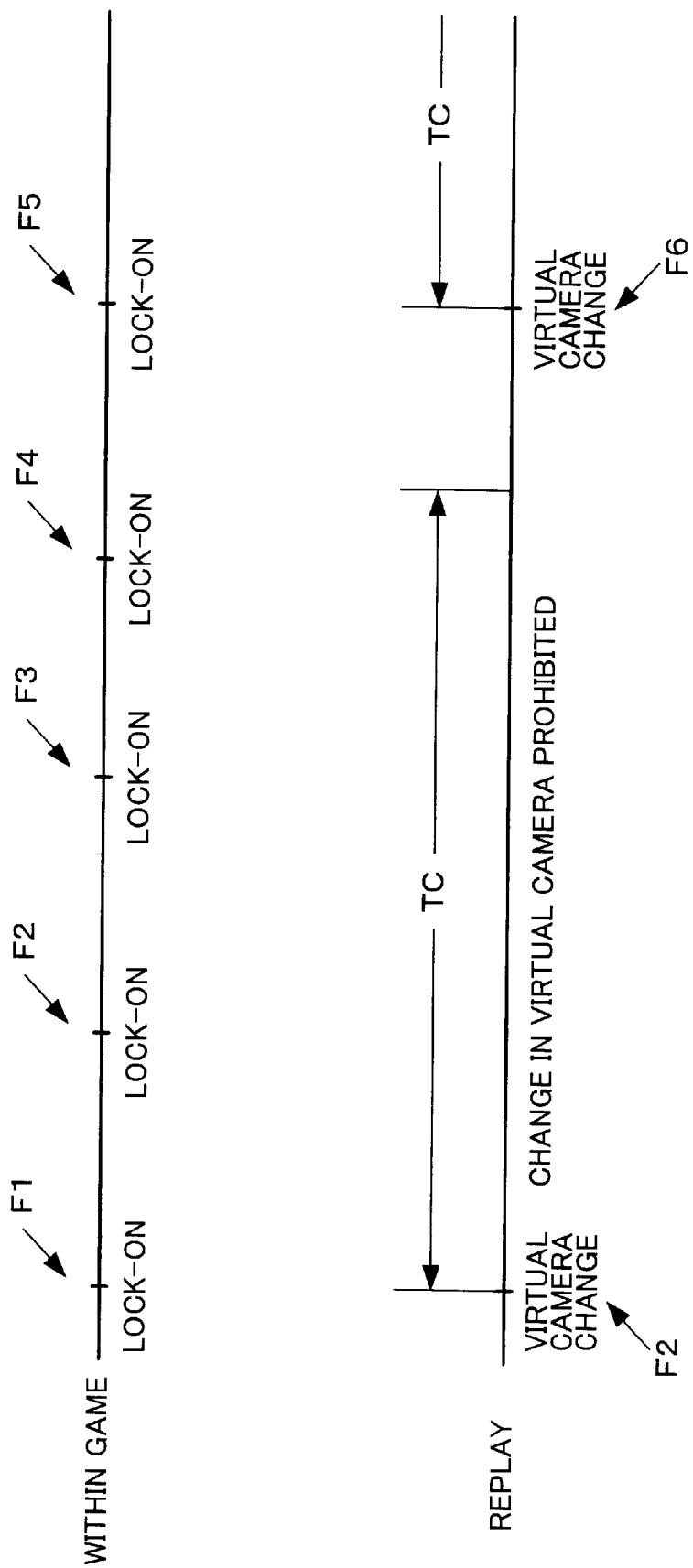
FIG. 8 is illustrative of a method of prohibiting any change in virtual cameras once the virtual cameras have been changed, until a given period of time has elapsed.

If, as shown by way of example in FIG. 8, an enemy object is locked-onto at F1 during a game, the virtual cameras are changed by the replay processing at F2.

With this embodiment of the invention, however, once the virtual cameras have been changed in this manner, further change in virtual cameras is prohibited until a given period of time TC has elapsed. No virtual camera change processing is done, even if new lock-ons occur at F2, F3, and F4, for example. If another lock-on occurs at F5 after the given period of time TC has elapsed, the virtual cameras are changed at F6.

In other words, if the method of FIG. 8 is not used and lock-on to an enemy object occurs a number of times within a short period, the virtual camera will switch frequently (the images of FIGS. 4A and 4B will switch frequently) and the thus-created replay images will be extremely unpleasant to watch.

In contrast thereto, use of the method of FIG. 8 ensures that no change in virtual cameras is permitted until the given period of time TC has elapsed. This ensures that there is no frequent switching of virtual cameras, even if lock-on of enemy objects occurs several times within a short period, thus making it possible to ensure that the created replay images are natural and not disturbing.

3. Processing of this Embodiment of the Invention

Figure 9:
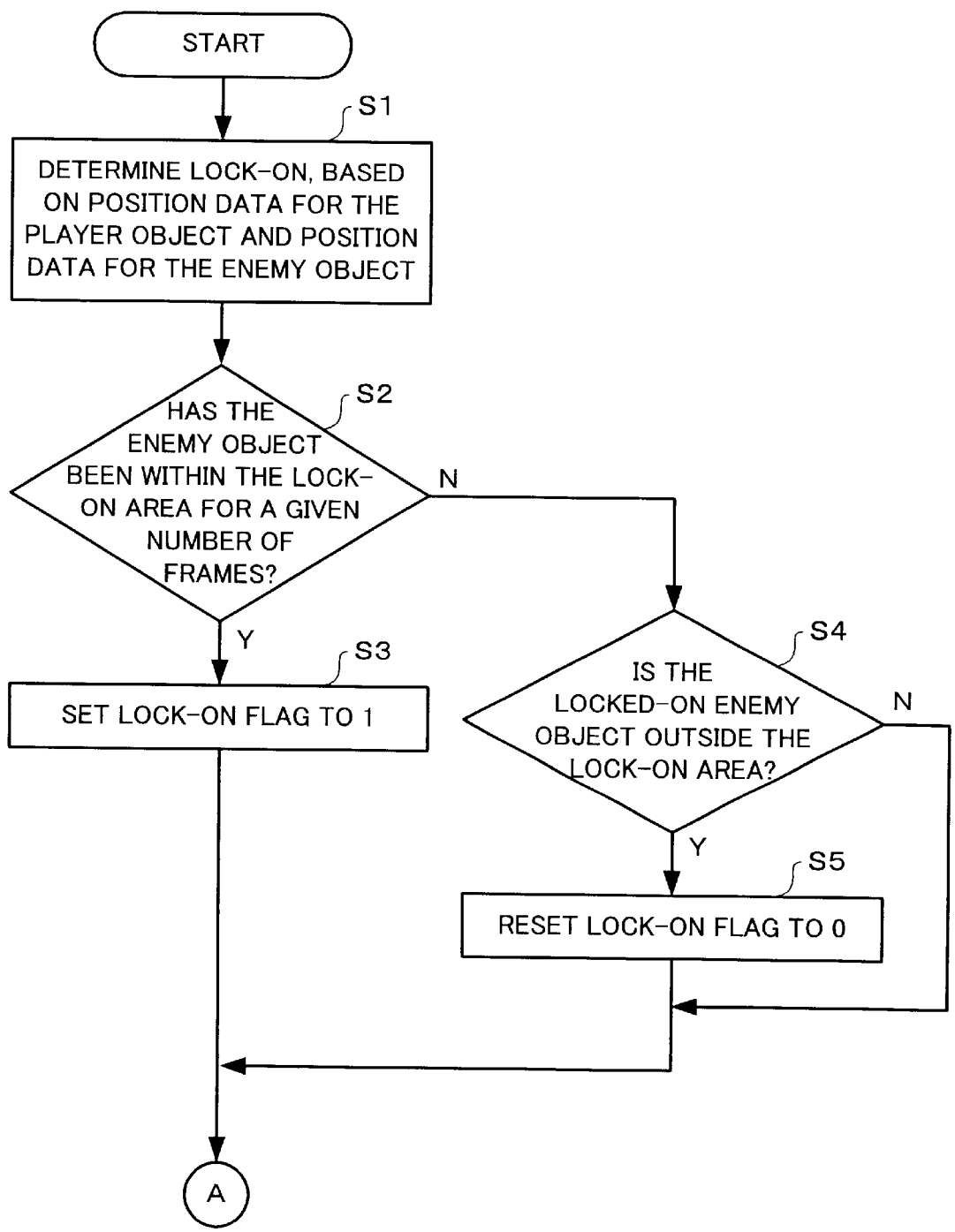
FIG. 9 is a flowchart of a detailed example of the processing of this embodiment of the invention.
Figure 10:
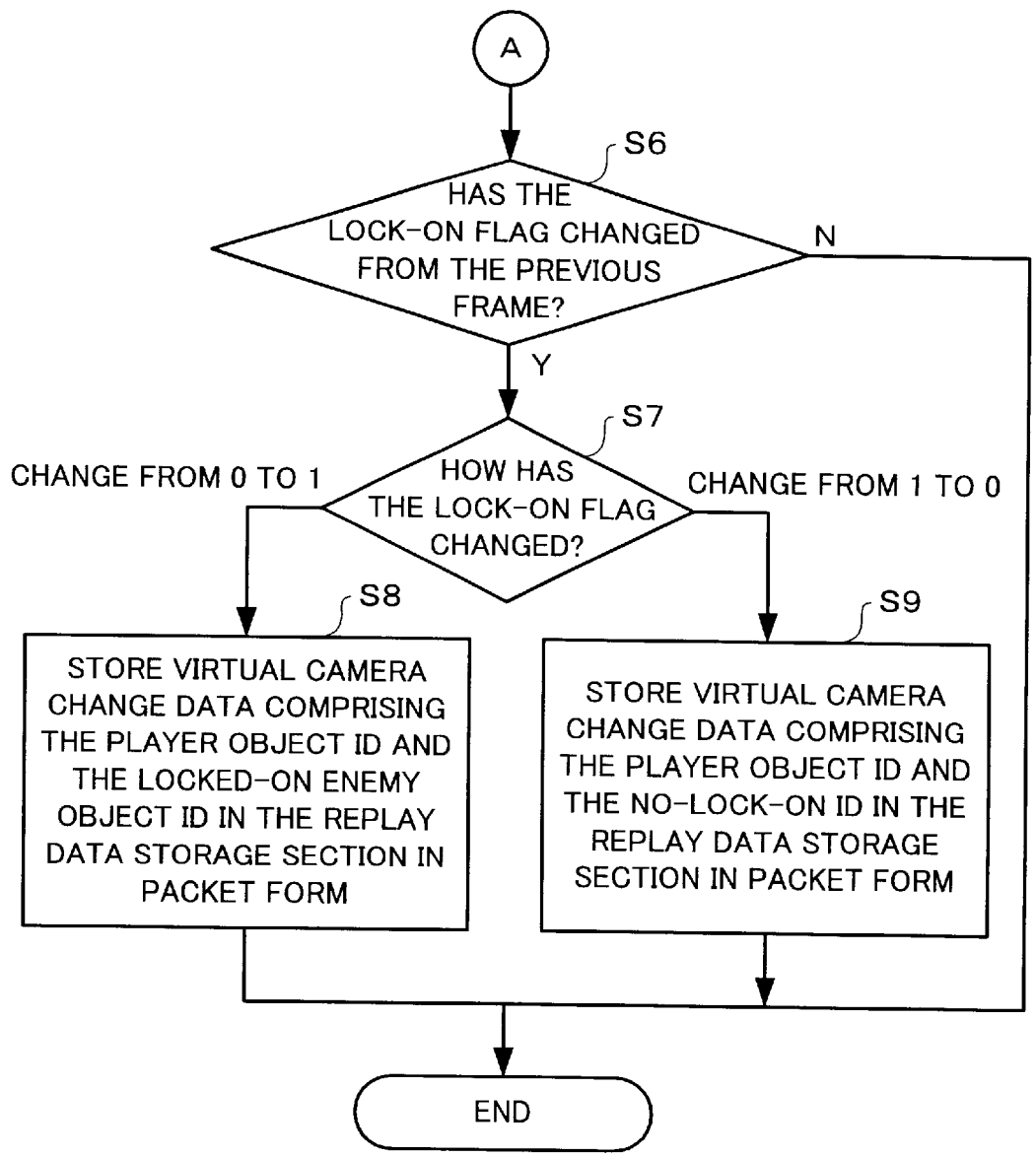
FIG. 10 is another flowchart of the detailed example of the processing of this embodiment of the invention.

A detailed example of the processing of this embodiment of the present invention will now be described, with reference to the flowcharts of FIGS. 9, 10, and 11.

First of all, lock-on (capture) determination processing is performed, based on position data for a player object and position data for an enemy object, and it is determined whether or not the enemy object has been within a lock-on area for a given number of frames (steps S1 and S2). If it has been therein, the lock-on flag is set to 1 (step S3).

Figure 12:
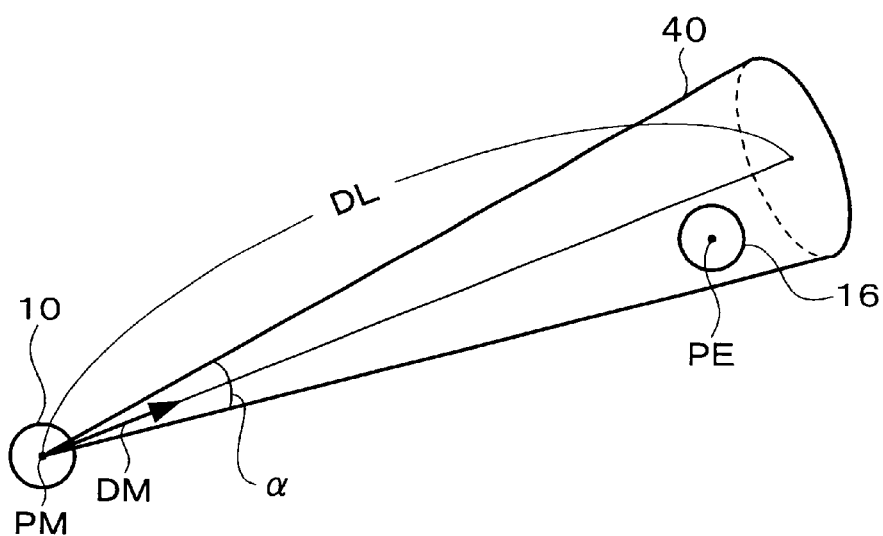
FIG. 12 is illustrative of the lock-on area.

In other words, a lock-on area 40 is set by, this embodiment of the invention, based on the position PM and direction DM (the shooting direction, etc.) of the player object 10, a given distance DL, and a given angle (solid angle) a, as shown in FIG. 12. The system then determines whether or not the enemy object 16 has been within the lock-on area 40 for a given number of frames, based on the position PE of the enemy object 16. If it has been within that area, the lock-on flag is set to 1.

If it is determined that the enemy object is not within the lock-on area, the system then determines whether or not an enemy object that had previously been locked-onto is outside the lock-on area (step S4). If it is outside that area, the lock-on flag is reset to 0 (step S5).

The system then determines whether or not the lock-on flag has changed from the previous frame (step S6). If it has not changed, no virtual camera change data is stored in the replay data storage section, as described with reference to FIG. 7.

If the lock-on flag has changed, on the other hand, the system then determines in what way the lock-on flag has changed (step S7). If the lock-on flag has changed from 0 to 1 (if a new lock-on has started), virtual camera change data comprising the ID (identification data) of the player object and the ID of the locked-on enemy object is stored in the replay data storage section in packet form (see FIG. 5) (step S8). If the lock-on flag has changed from 1 to 0 (if the lock-on has been canceled), on the other hand, virtual camera change data comprising the player object ID and a no-lock-on ID is stored in the replay data storage section in packet form (step S9).

Figure 11:
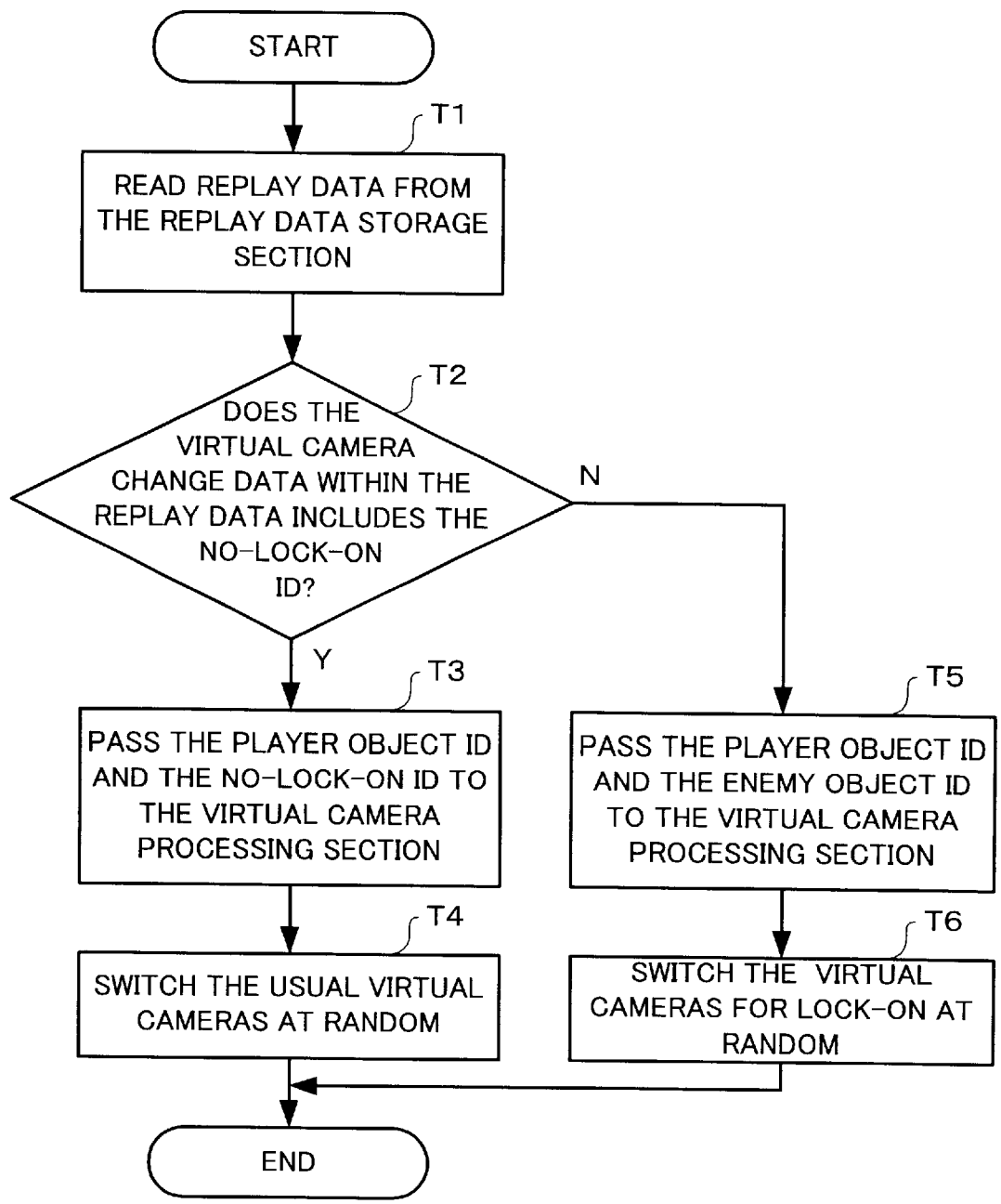
FIG. 11 is a further flowchart of the detailed example of the processing of this embodiment of the invention.

FIG. 11 is a flowchart of replay processing.

First of all, replay data is read from the replay data storage section (step T1). The system then determines whether or not the virtual camera change data comprised within the read-out replay data includes the no-lock-on ID (step T2). If there is such an ID, the player object ID and the no-lock-on ID are passed to the virtual camera processing section (virtual camera processing routine) (step T3). When that happens, the virtual camera processing section performs processing to switch the usual virtual cameras at random, as shown at E1 in FIG. 3 (step T4). If there is no no-lock-on ID, on the other hand, the player object ID and the enemy object ID are passed to the virtual camera processing section (step T5). When that happens, the virtual camera processing section performs processing to switch the virtual cameras for lock-on at random, as shown at E2 in FIG. 3.

The above described configuration ensures that, if an enemy object is locked-onto during a game, the virtual cameras used in the creation of replay images are changed to virtual cameras for lock-on.

4. Hardware Configuration

Figure 13:
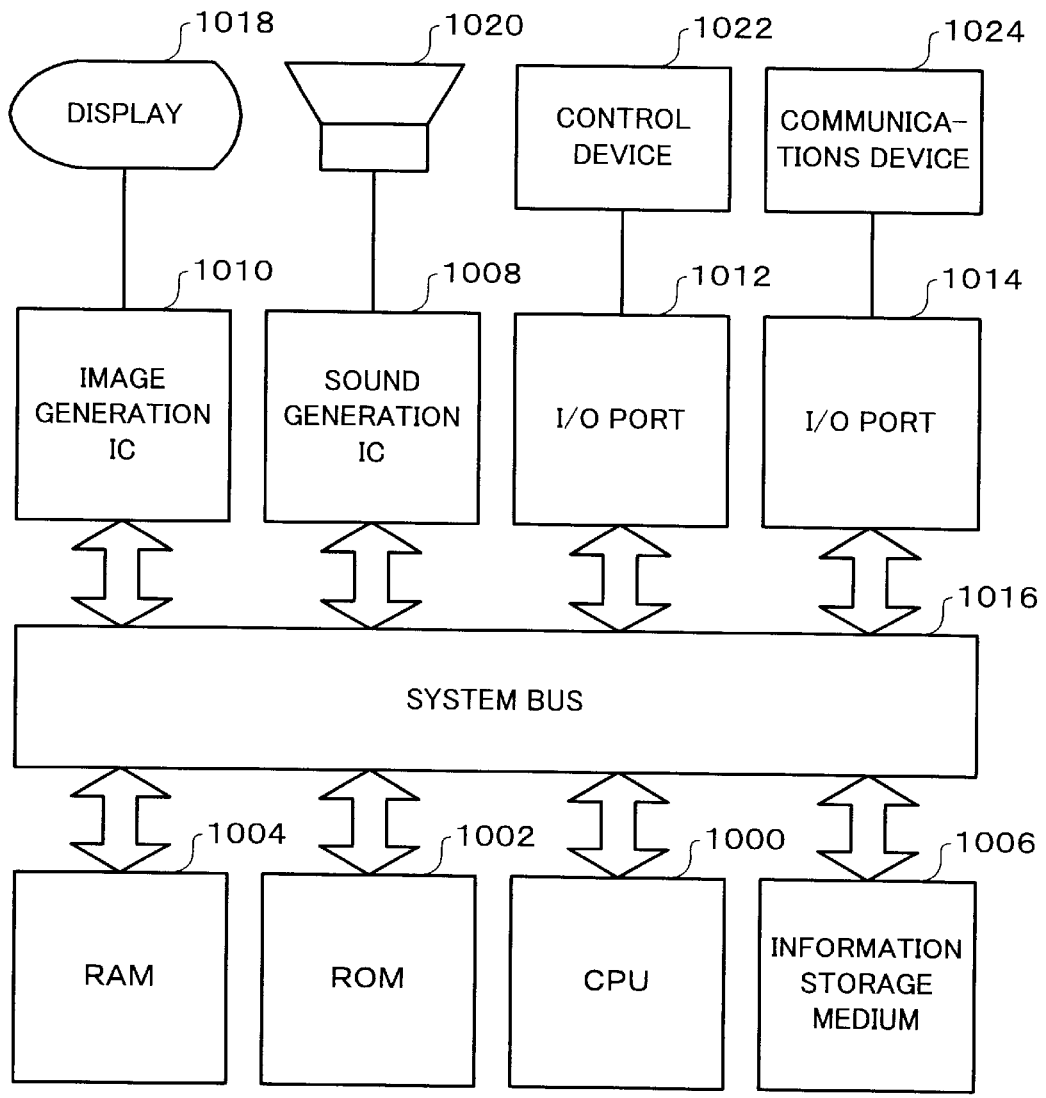
FIG. 13 shows an example of the configuration of hardware that can implement this embodiment of the present invention.

The description now turns to an example of hardware that can implement this invention, with reference to FIG. 13. In the system shown in this figure, a CPU 1000, ROM 1002, RAM 1004, an information storage medium 1006, a sound generation IC 1608, an image generation IC 1010, and I/O ports 1012 and 1014 are connected together by a system bus 1016 in such a manner that data can be mutually transferred therebetween. A display 1018 is connected to the image generation IC 1010, a speaker 1020 is connected to the sound generation IC 1008, a control device 1022 is connected to the I/O port 1012, and a communications device 1024 is connected to the I/O port 1014.

The information storage medium 1006 is mainly used for storing a program together with image data, sound data, or the like for representing display objects. Means such as a DVD, game cassette, or CD-ROM could be used as an information storage medium for storing a game program and other data for a domestic game machine. Alternatively, memory such as ROM could be used for an arcade game machine, in which case the information storage medium 1006 is the ROM 1002.

The control device 1022 is equivalent to a game controller or operating panel and it is used as a device for inputting into the main unit of the system the results of decisions made by the player as the game progresses.

The CPU 1000 controls the entire system and processes data in accordance with the game program stored in the information storage medium 1006, a system program stored in the ROM 1002 (including initialization information for the entire system), and signals input through the control device 1022. The RAM 1004 is a storage means that is used as a work space for the CPU 1000, and specific details from the information storage medium 1006 or the ROM 1002, or the results of calculations by the CPU 1000, are stored therein. A data configuration having a logical structure suitable for implementing this embodiment of the invention is constructed within this RAM or information storage medium.

The provision of the sound generation IC 1008 and the image generation IC 1010 in this type of system makes it possible to output game sounds and game images as required. The sound generation IC 1008 is an integrated circuit device that generates game sounds such as sound effects and background music, based on information stored in the information storage medium 1006 or the ROM 1002, and the thus generated game sounds are output by the speaker 1020. The image generation IC 1010 is an integrated circuit device that generates pixel information for output to the display 1018, based on image information that is sent from components such as the RAM 1004, the ROM 1002, and the information storage medium 1006. Note that a device called a head-mounted display (HMD) could also be used as the display 1018.

The communications device 1024 is designed to transfer various types of information used within the game system to and from external devices, and it is used to send given information in accordance with a game program when connected to another game system, or to send information such as a game program over a communications line.

The processing described with reference to FIGS. 1 to 12 is implemented by components such as the information storage medium 1006 that contains information such as a program and data, the CPU 1000 that operates in accordance with that information, and the image generation IC 1010 or the sound generation IC 1008. Note that the processing executed by the image generation IC 1010 and the sound generation IC 1008 could be performed in a software manner by means such as the CPU 1000 or an ordinary DSP.

Figure 14A:
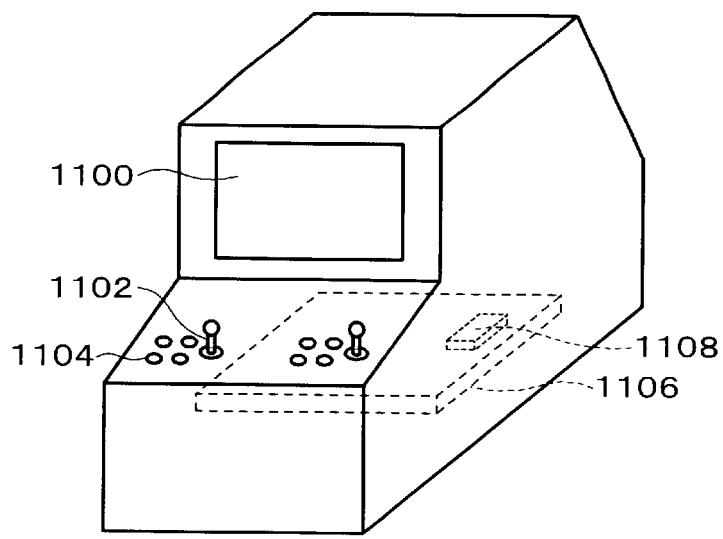
FIGS. 14A, 14B, and 14C show examples of various different systems to which the present invention can be applied.

An example of this embodiment of the invention applied to an arcade game machine is shown in FIG. 14A. A player enjoys this game by operating controls such as a joystick 1102 and buttons 1104 while viewing a game image shown on a display 1100. Components such as a CPU, an image generation IC, and a sound generation IC are mounted on an internal system board (circuit board) 1106. Information for implementing the processing of this embodiment of the invention (the means of the present invention) is stored in a semiconductor memory 1108 that is an information storage medium on the system board 1106. This information is hereinafter called stored information.

Figure 14B:
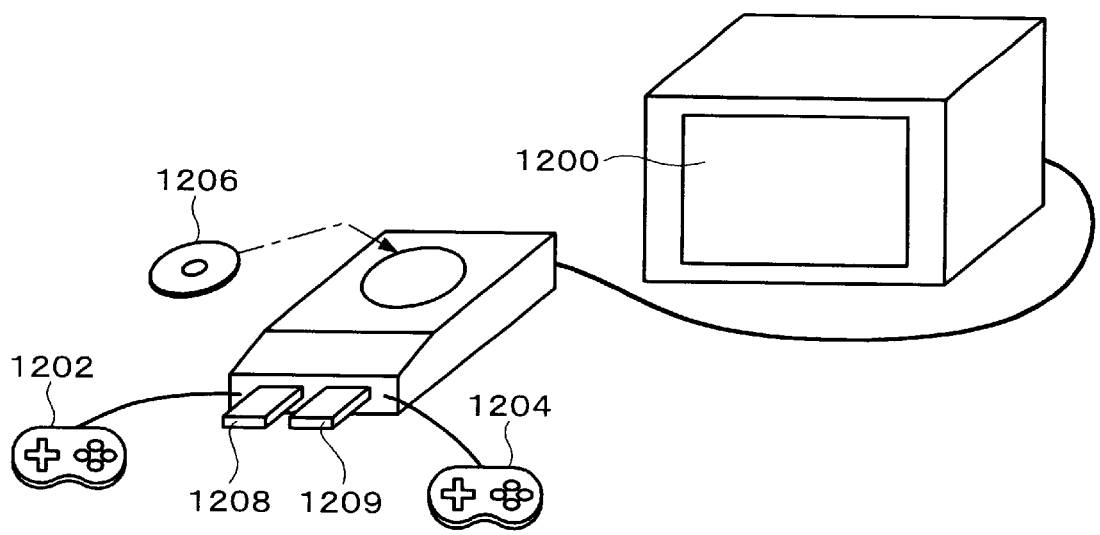

An example of this embodiment of the invention applied to a domestic game machine is shown in FIG. 14B. Players enjoy the game by manipulating game controllers 1202 and 1204 while viewing a game image shown on a display 1200.

In this case, the above described stored information is stored in a CD-ROM 1206 or IC cards 1208 and 1209, which are information storage media that can be freely inserted into and removed from the main unit of the system.

Figure 14C:
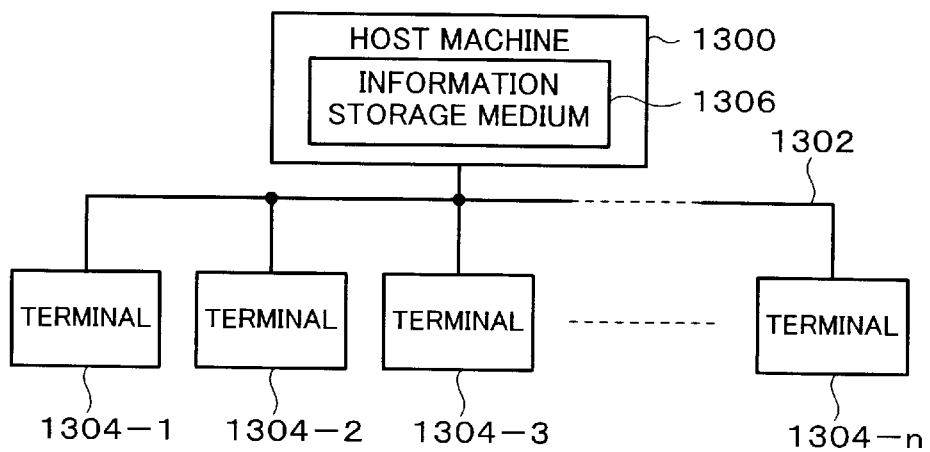

An example of this embodiment applied to a game machine is shown in FIG. 14C where the game machine comprises a host machine 1300 and terminals 1304-1 to 1304-n that are connected to the host machine 1300 by communications lines 1302 (a small-area network such as a LAN or a large-area network such as the Internet. In this case, the above described stored information is stored in an information storage medium 1306 such as a magnetic disk device, magnetic tape device, or memory that can be controlled by the host machine 1300. Each of the terminals 1304-1 to 1304-n has a CPU, an image generation IC, and a sound processing IC. In addition, if game images and sounds can be generated by the terminals 1304-1 to 1304-n in a stand-alone manner, means such as a game program for generating game images and sounds is transferred thereto from the host machine 1300. If game images and sounds cannot be generated in a stand-alone manner by the terminals 1304-1 to 1304-n, on the other hand, the host machine 1300 creates them then transfers them to those terminals for output thereby.

Note that the processing of this invention in the configuration shown in FIG. 14C could also be divided between the host machine (server) and the terminals. Similarly, the above described stored information used for implementing this invention could be divided between an information storage medium on the host machine (server) and information storage media of the terminals.

In addition, the terminals connected by the communications lines could be either domestic game systems or arcade game systems. If arcade game systems are connected by communications lines, it is preferable to use portable information storage devices (memory cards or hand-held game machines) that can exchange information with arcade game systems and also exchange information with domestic game systems.

Note that this invention is not limited to the above described embodiments and thus it can be implemented in various other ways.

For example, the inventions disclosed in dependent claims herein could also be configured in such a manner that some of the structural components listed in precedent claims thereof are omitted. Similarly, the components of the invention listed in one independent claim herein can also be associated with another independent claim.

Furthermore, this embodiment of the present invention has been described by way of a method of storing virtual camera change data when an enemy object is in a lock-on state. However, the capture state of the present invention is not limited to this lock-on state and various other states could be considered therefor. For example, a game could be considered in which an object (character) that is manipulated by the player and has a virtual camera is moved within a game space, monsters and other creatures within the game space are pictured by the virtual camera, and the thus-pictured images can be displayed and printed. In such a game, the picturing of monsters by the virtual camera is equivalent to the capturing of the present invention.

This embodiment of the present invention has also been mainly described as relating to a method wherein virtual camera change data is stored as replay data when a second object is in a capture state, and the virtual cameras used in the creation of replay images are changed. However, the present invention can also be applied widely to methods wherein virtual camera change data is stored as replay data and virtual cameras used in the creation of replay images are changed whenever various different actions between the first and second objects have occurred, not just the action of capturing, or when such an action has become possible.

Figure 15A:
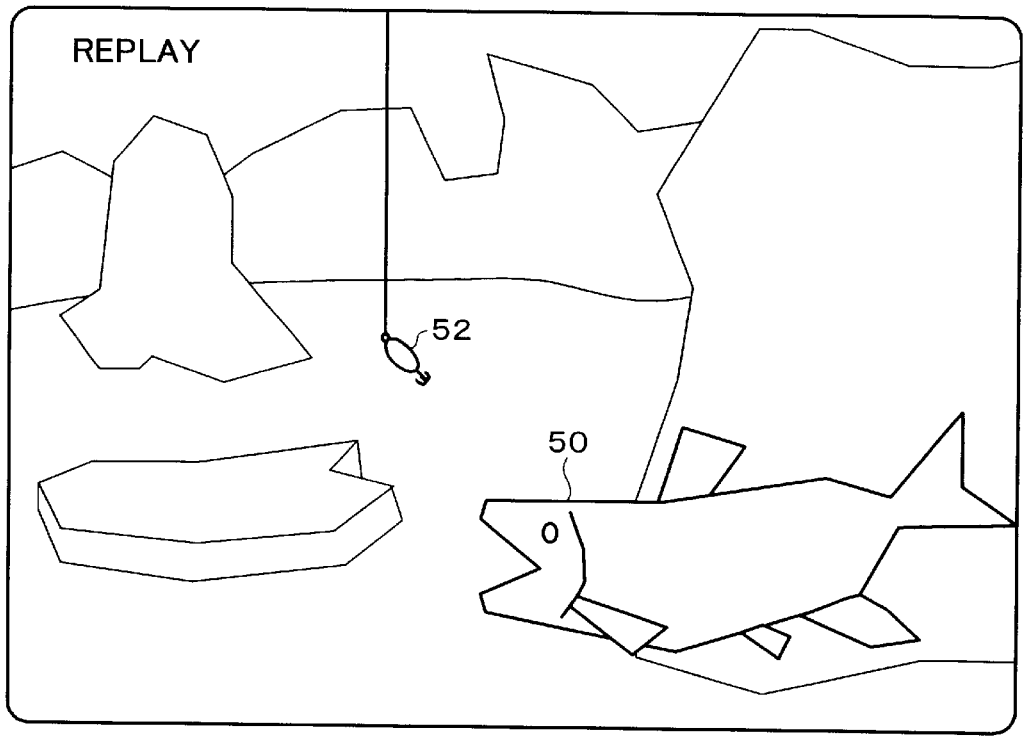
FIGS. 15A and 15B are illustrative of applications of the present invention to a fishing game and a baseball game.

In a fishing game shown in FIG. 15A by way of example, a situation could be considered in which an action called a strike has occurred between a lure 52 cast by a fisherman and a fish 50 (between first and second objects), or this strike action has become possible. In such a case, a virtual camera for replay is changed to a virtual camera that looks from the fish 50 side (a virtual camera disposed in close proximity to the fish 50), as shown in FIG. 15A, and a replay image as seen from this virtual camera is created.

Figure 15B:
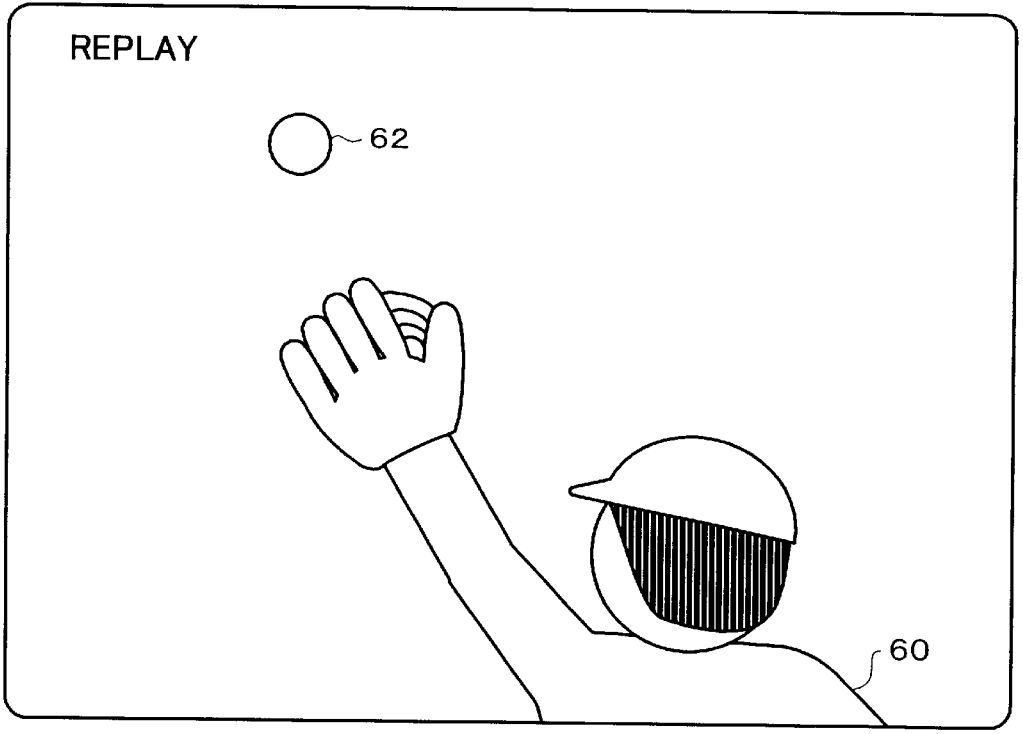

Similarly, in a baseball game as shown in FIG. 15B, a situation could be considered in which a batter has hit a ball 62 and an action called a catch has occurred between the ball 62 (or batter) and an outfielder 60, or this catch action has become possible. In such a case, a virtual camera for replay is changed to a virtual camera that looks from the outfielder 60 side (a virtual camera disposed in close proximity to the outfielder 60) as shown in FIG. 15B, and a replay image as seen from this virtual camera is created.

Figure 16:
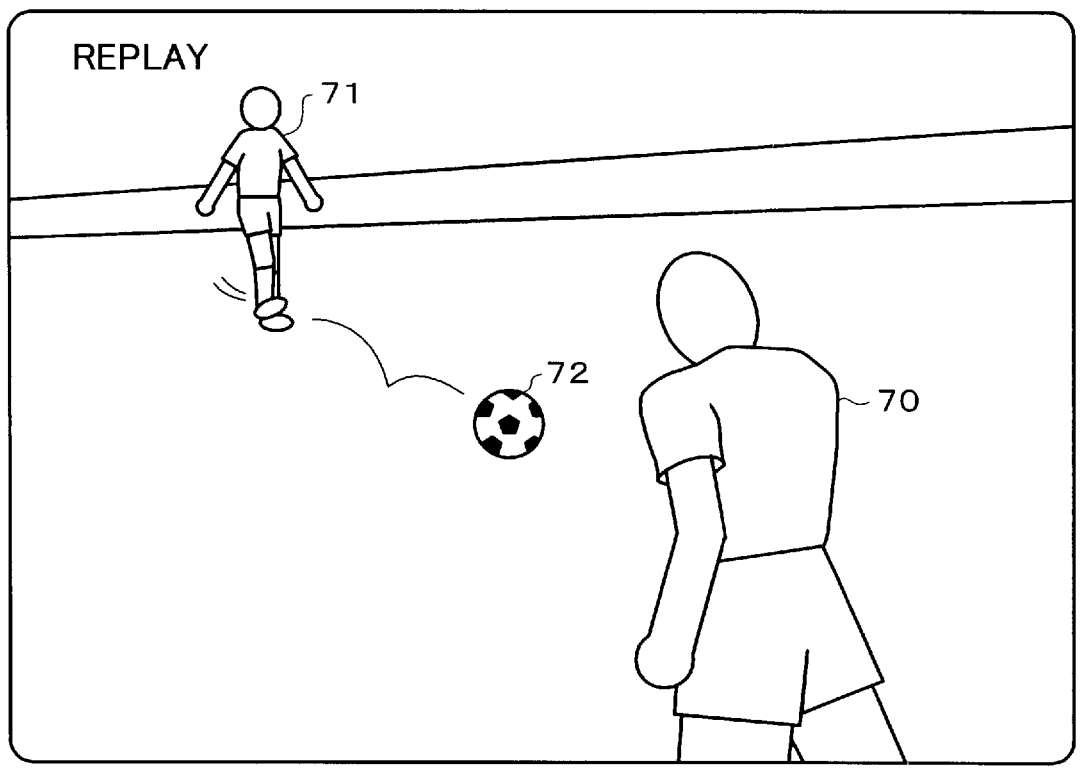
FIG. 16 is illustrative of an application of the present invention to a soccer game.

Furthermore, in a soccer game as shown in FIG. 16, a situation could be considered in which a soccer player 71 has kicked a ball 72 and an action called a pass has occurred between the ball 72 (or the soccer player 71) and another soccer player 70, or such a pass has become possible. In such a case, a virtual camera for replay is changed to a virtual camera that looks from the soccer player 70 side (a virtual camera disposed in close proximity to the soccer player 70) as shown in FIG. 16, and a replay image as seen from this virtual camera is created.

Note that various other actions could be considered in accordance with the present invention, other than a capture, strike, catch, or pass, such as an attack (kick, punch, or shot), defense, collision, or hit.

Note that the determination as to whether or not an action has occurred between the first and second objects, or whether or not such an action has become possible, is preferably done by checking whether or not there is a given positional relationship between the first and second objects. For example, the determination as to whether or not the strike action of FIG. 15A has occurred is based on position data of the lure 52 and the fish 50. Similarly, the determination as to whether or not the catch action of FIG. 15B has occurred is based on position data of the ball 62 and the outfielder 60. Furthermore, the determination as to whether or not the pass action of FIG. 16 has occurred is based on position data of the ball 72 (or the soccer player 71) and the soccer player 70.

It should be noted, however, that virtual camera change data could be stored after the algorithms that control the motions of the fish 50 in FIG. 15A have detected a change in the thoughts (intelligence) of the fish 50, by way of example. In other words, the virtual camera change data could be stored if the fish 50 has thought of eating the lure 52, to change the virtual camera for replay. Similarly, virtual camera change data could be stored after the algorithms that control the motions of the outfielder 60 of FIG. 15B or the soccer player 70 of FIG. 16 have detected a change in the thoughts of that character, to change the virtual camera for replay.

The present invention is not limited to the embodiments described herein and thus it can be applied to various games other than shooting games (such as sports games, vehicle games, flight simulators, hand-to-hand combat games, competitive games, robot-battling games, role-playing games, music-playing games, and dance games).

This invention is also not limited to arcade and domestic game machines; it can be applied to various other game systems such as large-scale attractions in which many players can participate, simulators, multimedia terminals, image generation systems, and system boards that create game images.

What is claimed is:

1. A game system which creates a game image, comprising:
    a writing section which writes virtual camera change data as replay data into a replay data storage means for storage when a second object within a plurality of objects has come into a capture state within a game;
    a replay processing section which reads the replay data and performs the replay processing for creating replay images; and
    a changing section which changes virtual cameras that are used in the creation of replay images during the replay processing, based on the virtual camera change data which is stored during the game and is comprised within the thus-stored replay area.

2. The game system as defined in claim 1, wherein the capture state is a lock-on state in a shooting game.

3. The game system as defined in claim 1, wherein a virtual camera used in the creation of replay images is changed to a virtual camera directed towards the second object from the first object or a player's viewpoint, based on the virtual camera change data.

4. The game system as defined in claim 1, wherein a virtual camera used in the creating of replay images is changed to a virtual camera disposed in close proximity to the second object, based on the virtual camera change data.

5. The game system as defined in claim 1, wherein a packet necessary for the replay processing of the current frame is determined from among packets used for replay processing and is written into the replay data storage means as replay data corresponding to the current frame, for storage; and
    wherein the virtual camera change data is written into the replay data storage means as one of the packets used for replay processing, for storage.

6. The game system as defined in claim 1, wherein virtual camera change data is written into the replay data storage means as replay data, on condition that there is a change in the virtual camera change data from the previous frame.

7. The game system as defined in claim 1, wherein after the virtual cameras have been changed on the basis of the virtual camera change data, further change of virtual cameras is prohibited until a given period of time has elapsed, even if further change of virtual cameras is directed.

8. A game system which creates a game image, comprising:
    a writing section which writes virtual camera change data as replay data into a replay data storage means for storage when an action has occurred between first and second objects or when the action has become possible;
    a replay processing section which reads the replay data and performs the replay processing for creating replay images; and
    a changing section which changes virtual cameras that are used in the creation of replay images during the replay processing, based on the virtual camera change data which is stored during the game and is comprised within the thus-stored replay data.

9. The game system as defined in claim 8, wherein a virtual camera used in the creation of replay images is changed to a virtual camera directed towards the second object from the first object or a player's viewpoint, based on the virtual camera change data.

10. The game system as defined in claim 8, wherein a virtual camera used in the creation of replay images is changed to a virtual camera disposed in close proximity to the second object, based on the virtual camera change data.

11. The game system as defined in claim 8, wherein a packet necessary for the replay processing of the current frame is determined from among packets used for replay processing and is written into the replay data storage means as replay data corresponding to the current frame, for storage; and
    wherein the virtual camera change data is written into the replay data storage means as one of the packets used for replay processing, for storage.

12. The game system as defined in claim 8, wherein virtual camera change data is written into the replay data storage means as replay data, on condition that there is a change in the virtual camera change data from the previous frame.

13. The game system as defined in claim 8, wherein after the virtual cameras have been changed on the basis of the virtual camera change data, further change of virtual cameras is prohibited until a given period of time has elapsed, even if further change of virtual cameras is directed.

14. A game system which creates a game image, comprising:
    a writing section which writes virtual camera change data as replay data in a replay data storage means for storage, when it has been determined that first and second objects are in a given positional relationship, based on position data of the first and second objects; and
    a replay processing section which reads the replay data and performs the replay processing for creating replay images; and
    a changing section which changes virtual cameras that are used in the creation of replay images during the replay processing, based on the virtual camera change data which is stored during the game and is comprised within the thus-stored replay data.

15. The game system as defined in claim 14, wherein a virtual camera used in the creation of replay images is changed to a virtual camera directed towards the second object from the first object or a player's viewpoint, based on the virtual camera change data.

16. The game system as defined in claim 14, wherein a virtual camera used in the creation of replay images is changed to a virtual camera disposed in close proximity to the second object, based on the virtual camera change data.

17. The game system as defined in claim 14, wherein a packet necessary for the replay processing of the current frame is determined from among packets used for replay processing and is written into the replay data storage means as replay data corresponding to the current frame, for storage; and wherein the virtual camera change data is written into the replay data storage means as one of the packets used for replay processing, for storage.

18. The game system as defined in claim 14, wherein virtual camera change data is written into the replay data storage means as replay data, on condition that there is a change in the virtual camera change data from the previous frame.

19. The game system as defined in claim 14, wherein after the virtual cameras have been changed on the basis of the virtual camera change data, further change of virtual cameras is prohibited until a given period of time has elapsed, even if further change of virtual cameras is directed.

20. A computer-usable program embodied on an information storage medium or in a carrier wave, comprising a processing routine for implementing:

a writing section which writes virtual camera change data as replay data into a replay data storage means for storage when a second object within a plurality of objects has come into a capture state within a game;

a replay processing section which reads the replay data and performs the replay processing for creating replay images; and a changing section which changes virtual cameras that are used in the creation of replay images during the replay processing, based on the virtual camera change data which is stored during the game and is comprised within the thus-stored replay data.

21. The program as defined in claim 20, wherein the capture state is a lock-on state in a shooting game.

22. The program as defined in claim 20, wherein a virtual camera used in the creation of replay images is changed to a virtual camera directed towards the second object from the first object or a player's viewpoint, based on the virtual camera change data.

23. The program as defined in claim 20, wherein a virtual camera used in the creation of replay images is changed to a virtual camera disposed in close proximity to the second object, based on the virtual camera change data.

24. The program as defined in claim 20, wherein a packet necessary for the replay processing of the current frame is determined from among packets used for replay processing and is written into the replay data storage means as replay data corresponding to the current frame, for storage; and wherein the virtual camera change data is written into the replay data storage means as one of the packets used for replay processing, for storage.

25. The program as defined in claim 20, wherein virtual camera change data is written into the replay data storage means as replay data, on condition that there is a change in the virtual camera change data from the previous frame.

26. The program as defined in claim 20, wherein after the virtual cameras have been changed on the basis of the virtual camera change data, further change of virtual cameras is prohibited until a given period of time has elapsed, even if further change of virtual cameras is directed.

27. A computer-usable program embodied on an information storage medium or in a carrier wave, comprising a processing routine for implementing:

a writing section which writes virtual camera change data as replay data into a replay data storage means for storage when an action has occurred between first and second objects or when the action has become possible;

a replay processing section which reads the replay data and performs the replay processing for creating replay images; and a changing section which changes virtual cameras that are used in the creation of replay images during the replay processing, based on the virtual camera change data which is stored during the game and is comprised within the thus-stored replay data.

28. The program as defined in claim 27, wherein a virtual camera used in the creation of replay images is changed to a virtual camera directed towards the second object from the first object or a player's viewpoint, based on the virtual camera change data.

29. The program as defined in claim 27, wherein a virtual camera used in the creation of replay images is changed to a virtual camera disposed in close proximity to the second object, based on the virtual camera change data.

30. The program as defined in claim 27, wherein a packet necessary for the replay processing of the current frame is determined from among packets used for replay processing and is written into the replay data storage means as replay data corresponding to the current frame, for storage; and wherein the virtual camera change data is written into the replay data storage means as one of the packets used for replay processing, for storage.

31. The program as defined in claim 27, wherein virtual camera change data is written into the replay data storage means as replay data, on condition that there is a change in the virtual camera change data from the previous frame.

32. The program as defined in claim 27, wherein after the virtual cameras have been changed on the basis of the virtual camera change data, further change of virtual cameras is prohibited until a given period of time has elapsed, even if further change of virtual cameras is directed.

33. A computer-usable program embodied on an information storage medium or in a carrier wave, comprising a processing routine for implementing:

a writing section which writes virtual camera change data as replay data in a replay data storage means for storage, when it has been determined that first and second objects are in a given positional relationship, based on position data of the first and second objects;

a replay processing section which reads the replay data and performs the replay processing for creating replay images; and changing section which changes virtual cameras that are used in the creation of replay images during the replay processing, based on the virtual camera change data which is stored during the game and is comprised within the thus-stored replay data.

34. The program as defined in claim 33, wherein a virtual camera used in the creation of replay images is changed to a virtual camera directed towards the second object from the first object or a player's viewpoint, based on the virtual camera change data.

35. The program as defined in claim 33, wherein a virtual camera used in the creation of replay images is changed to a virtual camera disposed in close proximity to the second object, based on the virtual camera change data.

36. The program as defined in claim 33, wherein a packet necessary for the replay processing of the current frame is determined from among packets used for replay processing and is written into the replay data storage means as replay data corresponding to the current frame, for storage; and wherein the virtual camera change data is written into the replay data storage means as one of the packets used for replay processing for storage.

37. The program as defined by claim 33, wherein:

wherein virtual camera change data is written into the replay data storage means as replay data, on condition that there is a change in the virtual camera change data from the previous frame.

38. The program as defined in claim 33, wherein after the virtual cameras have been changed on the basis of the virtual camera change data, further change of virtual cameras is prohibited until a given period of time has elapsed, even if further change of virtual cameras is directed.

39. A method for generating game images, comprising:

writing virtual camera change data as replay data into a replay data storage memory for storage when a second object within a plurality of objects has come into a capture state within a game;

reading the replay data and performing the replay processing for creating replay images; and changing virtual cameras that are used in the creation of replay images during the replay processing, based on the virtual camera change data which is stored during the game and is comprised within the replay data.

40. The method as defined in claim 39, further comprising:

determining a packet necessary for the replay processing of the current frame from among packets used for replay processing and writing the determined packet into the replay data storage memory as replay data corresponding to the current frame; and writing the virtual camera change data into the replay data storage memory as one of the packets used for replay processing.

41. The method as defined in claim 39, further comprising:

writing virtual camera change data into the replay data storage memory as replay data, on condition that there is a change in the virtual camera change data from the previous frame.

42. The method as defined in claim 39, further comprising:

prohibiting further change of virtual cameras until a given period of time has elapsed, even if further change of virtual cameras is directed, after the virtual cameras have been changed on the basis of the virtual camera change data.

43. A method for generating game images, comprising:

writing virtual camera change data as replay data into a replay data storage memory for storage when an action has occurred between first and second objects or when the action has become possible;

reading the replay data and performing the replay processing for creating replay images; and changing virtual cameras that are used in the creation of replay images during the replay processing, based on the virtual camera change data which is stored during the game and is comprised within the replay data.

44. The method as defined in claim 40, further comprising:

determining a packet necessary for the replay processing of the current frame from among packets used for replay processing and writing the determined packet into the replay data storage memory as replay data corresponding to the current frame; and writing the virtual camera change data into the replay data storage memory as one of the packets used for replay processing.

45. The method as defined in claim 43, further comprising:

writing virtual camera change data into the replay data storage memory as replay data, on condition that there is a change in the virtual camera change data from the previous frame.

46. The method as defined in claim 43, further comprising:

prohibiting further change of virtual cameras until a given period of time has elapsed, even if further change of virtual cameras is directed, after the virtual cameras have been changed on the basis of the virtual camera change data.

47. A method for generating game images, comprising:

writing virtual camera change data as replay data in a replay data storage memory for storage, when it has been determined that first and second objects are in a given positional relationship, based on position data of the first and second objects; and reading the replay data and performing the replay processing for creating replay processing for creating replay images; and changing virtual cameras that are used in the creation of replay images during the replay processing, based on the virtual camera change data which is stored during the game and is comprised within the replay data.

48. The method as defined in claim 47, further comprising:

determining a packet necessary for the replay processing of the current frame from among packets used for replay processing and writing the determined packet into the replay data storage memory as replay data corresponding to the current frame; and writing the virtual camera change data into the replay data storage memory as one of the packets used for replay processing.

49. The method as defined in claim 47, further comprising:

writing virtual camera change data into the replay data storage memory as replay data, on condition that there is a change in the virtual camera change data from the previous frame.

50. The method as defined in claim 47, further comprising:

prohibiting further change of virtual cameras until a given period of time has elapsed, even if further change of virtual cameras is directed, after the virtual cameras have been changed on the basis of the virtual camera change data.

* * * * *